US010700757B2

(12) United States Patent
Singh et al.

(10) Patent No.: US 10,700,757 B2
(45) Date of Patent: Jun. 30, 2020

(54) SELECTION OF BEAMFORMING DIRECTIONS BASED ON LEARNED PERFORMANCE

(71) Applicant: Intel Corporation, Santa Clara, CA (US)

(72) Inventors: Sarabjot Singh, Santa Clara, CA (US); Claudio Da Silva, San Jose, CA (US); Wook Bong Lee, San Jose, CA (US); Nageen Himayat, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 30 days.

(21) Appl. No.: 16/082,752

(22) PCT Filed: Jul. 29, 2016

(86) PCT No.: PCT/US2016/044735
§ 371 (c)(1),
(2) Date: Sep. 6, 2018

(87) PCT Pub. No.: WO2017/184190
PCT Pub. Date: Oct. 26, 2017

(65) Prior Publication Data
US 2019/0097712 A1    Mar. 28, 2019

Related U.S. Application Data

(60) Provisional application No. 62/324,186, filed on Apr. 18, 2016.

(51) Int. Cl.
*H04B 7/06* (2006.01)
*H04B 7/0452* (2017.01)
(Continued)

(52) U.S. Cl.
CPC ............ *H04B 7/0695* (2013.01); *H04B 7/04* (2013.01); *H04B 7/0408* (2013.01);
(Continued)

(58) Field of Classification Search
None
See application file for complete search history.

(56) References Cited

U.S. PATENT DOCUMENTS

2013/0215844 A1* 8/2013 Seol .................... H04W 72/046
                                                      370/329
2014/0051351 A1* 2/2014 Jia ........................ H01C 21/007
                                                      455/39

(Continued)

FOREIGN PATENT DOCUMENTS

WO    WO-2014036150 A1     3/2014
WO    WO-2015106237 A1 *   7/2015
(Continued)

OTHER PUBLICATIONS

"International Application Serial No. PCT US2016 044735, International Preliminary Report on Patentability dated Nov. 1, 2018", 12 pgs.

(Continued)

*Primary Examiner* — Chi H Pham
*Assistant Examiner* — Vladislav Y Agureyev
(74) *Attorney, Agent, or Firm* — Schwegman Lundberg & Woessner, P.A.

(57) ABSTRACT

In a radio-access network utilizing beam-formed communications, beam direction for uplink or downlink communications is determined based on learned beam directions applicable to a current location of user equipment (UE) in lieu of a sector scan when prior transmission performance measures are available for the current location. A beam-finding map that associates a plurality of locations with (Continued)

corresponding beam directions previously determined to be operative to direct transmission from those locations to a recipient device is used.

17 Claims, 14 Drawing Sheets

(51) Int. Cl.
| | |
|---|---|
| H04W 16/28 | (2009.01) |
| H04W 64/00 | (2009.01) |
| H04B 7/0408 | (2017.01) |
| H04B 7/08 | (2006.01) |
| H04B 7/04 | (2017.01) |
| G06N 20/00 | (2019.01) |

(52) U.S. Cl.
CPC ............ *H04B 7/0452* (2013.01); *H04B 7/06* (2013.01); *H04B 7/0617* (2013.01); *H04B 7/0626* (2013.01); *H04B 7/08* (2013.01); *H04B 7/088* (2013.01); *H04W 16/28* (2013.01); *H04W 64/003* (2013.01); *G06N 20/00* (2019.01)

(56) References Cited

U.S. PATENT DOCUMENTS

| | | | |
|---|---|---|---|
| 2014/0148173 A1 | 5/2014 | Karaoguz | |
| 2015/0071268 A1* | 3/2015 | Kennedy | H04W 8/08 370/338 |
| 2015/0103756 A1* | 4/2015 | Sinha | H04B 7/0491 370/329 |
| 2015/0162966 A1* | 6/2015 | Kim | H04L 1/20 370/252 |
| 2015/0230263 A1* | 8/2015 | Roy | H04W 16/28 455/452.2 |
| 2015/0326704 A1* | 11/2015 | Ko | H04M 1/7253 455/456.3 |
| 2016/0014722 A1* | 1/2016 | Yoon | H04W 72/02 455/426.1 |
| 2016/0330643 A1* | 11/2016 | Sahin | H04W 16/14 |
| 2017/0111852 A1* | 4/2017 | Selen | H04B 7/0617 |
| 2017/0212204 A1* | 7/2017 | Amizur | G01S 5/04 |
| 2017/0222693 A1* | 8/2017 | Shen | H04B 7/0408 |
| 2018/0262255 A1* | 9/2018 | Lee | H04B 7/04 |
| 2019/0104549 A1* | 4/2019 | Deng | H04B 7/0617 |
| 2019/0349152 A1* | 11/2019 | Islam | H04W 72/046 |

FOREIGN PATENT DOCUMENTS

| | | | |
|---|---|---|---|
| WO | WO-2015106237 A1 | 7/2015 | |
| WO | WO-2015109153 A1 | 7/2015 | |
| WO | WO-2016086144 A1 * | 6/2016 | .......... H04B 7/0617 |
| WO | WO-2017184190 A1 | 10/2017 | |

OTHER PUBLICATIONS

"International Application Serial No. PCT/US2016/044735, International Search Report dated Jan. 17, 2017", 3 pgs.

"International Application Serial No. PCT/US2016/044735, Written Opinion dated Jan. 17, 2017", 10 pgs.

* cited by examiner

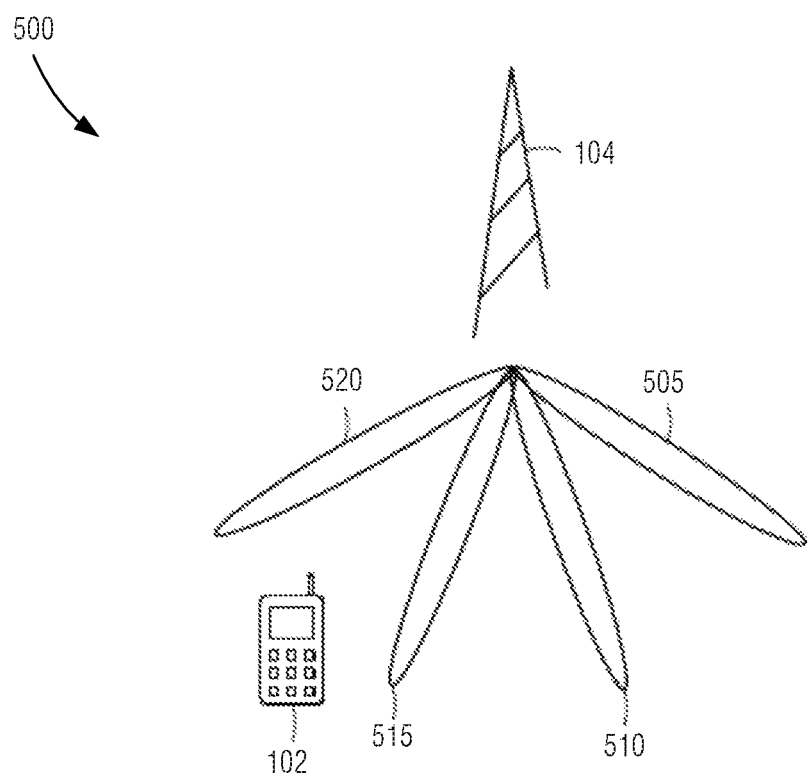
FIG. 5
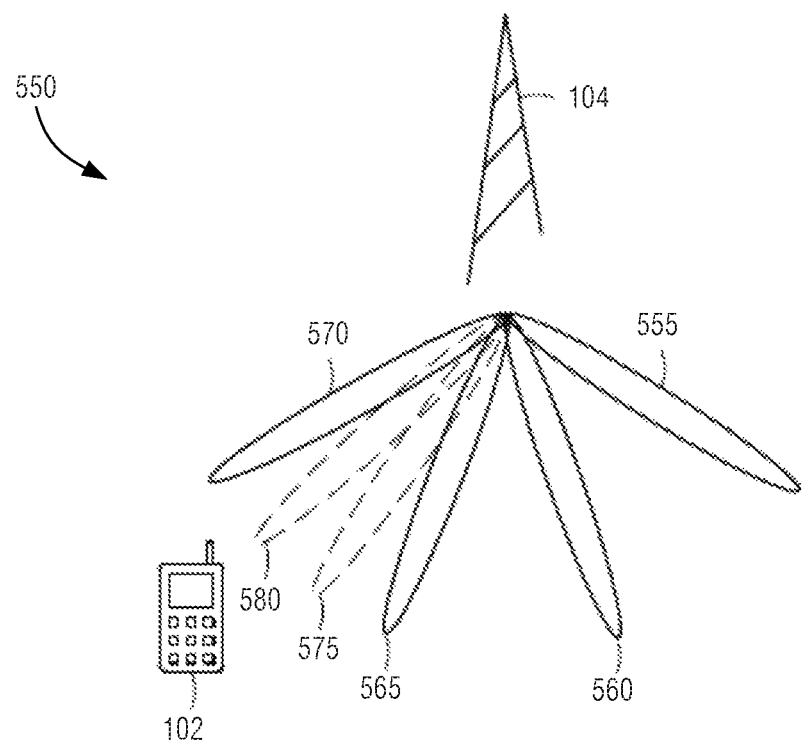

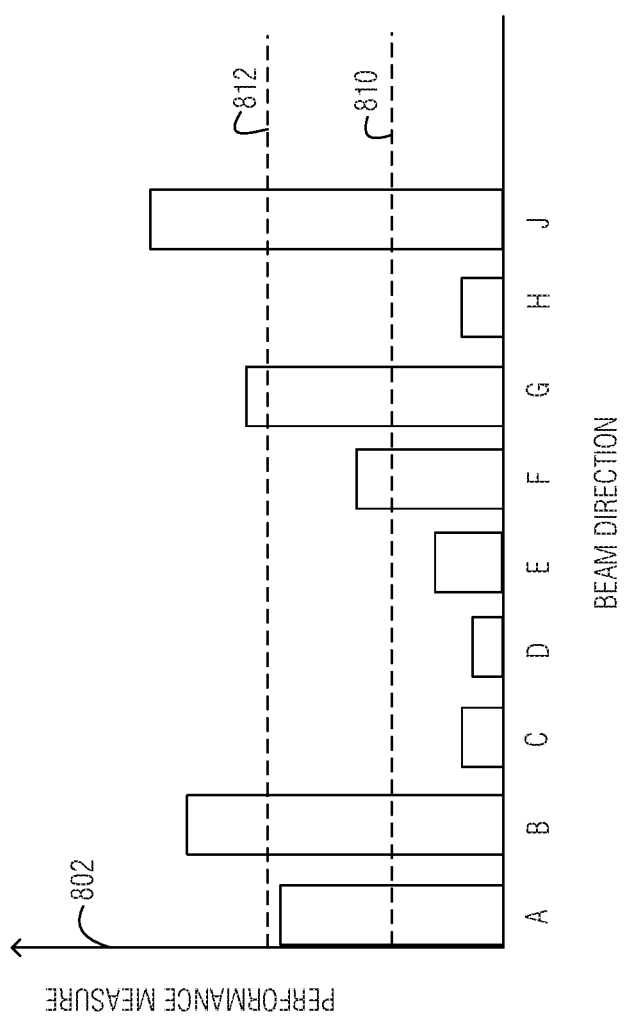

SELECTION OF BEAMFORMING DIRECTIONS BASED ON LEARNED PERFORMANCE

PRIORITY CLAIM

This Application is a U.S. National Stage Application under 35 U.S.C. 371 from International Application No. PCT/US2016/044735, filed Jul. 29, 2016, which claims the benefit of priority to U.S. Provisional Application No. 62/324,186, filed Apr. 18, 2016, the disclosure of which are incorporated by reference herein.

TECHNICAL FIELD

Embodiments pertain to wireless communications. Some embodiments relate to wireless networks including 3GPP (Third Generation Partnership Project) networks, 3GPP LTE (Long Term Evolution) networks, 3GPP LTE-A (LTE Advanced) networks, and fifth-generation (5G) networks. Other embodiments relate to Wi-Fi wireless local area networks (WLANs). Further embodiments are more generally applicable outside the purview of LTE and Wi-Fi networks. Aspects of the embodiments are directed to selection of beam directions in radio access networks that utilize beamforming.

BACKGROUND

Mobile data usage continues growing exponentially at a rate of nearly doubling year-after-year, and this trend is expected to continue. Although recent advances in cellular technology have made improvements in the performance and capacity of mobile networks, it is widely thought that such advances will still fall short of accommodating the anticipated demand for mobile data network service.

One approach to increasing mobile network capacity is utilizing higher frequency radio bands. Millimeter-wave communications, for example, use radio frequencies in the range of 30-300 GHz to provide colossal bandwidth by today's standards—on the order of 20 Gb/s, for example. The propagation of millimeter-wave radio signals differs considerably from more familiar radio signals in the 2-5 GHz range. For one, their range is significantly limited by comparison due to attenuation in the atmosphere. In addition, millimeter-wave signals experience reflections, refractions, and scattering due to walls, buildings and other objects to a much greater extent than lower-frequency signals. These physical challenges also present some useful opportunities for communication system designers. For example, the limited range of millimeter-wave transmissions make them suitable for resource-element (time slot and frequency) reuse in high-density deployments in city blocks, office buildings, schools, stadiums, and the like, where there may be a large plurality of user equipment devices. In addition, the potential for precise directionality control provides opportunity to make extensive use of multi-user multiple input/multiple output (MU-MIMO) techniques. Solutions are needed to make practical use of these opportunities in highly-directional wireless networks.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the following figures of the accompanying drawings.

FIG. 5 illustrates examples of multiple beam transmission in accordance with some embodiments.

FIG. 8 is a graph illustrating an example set of performance measure values for various beam directions, along with sufficiency and optimal thresholds, according to some embodiments.

DETAILED DESCRIPTION

The following description and the drawings sufficiently illustrate specific embodiments to enable those skilled in the art to practice them. A number of examples are described in the context of 3GPP communication systems and components thereof. It will be understood that principles of the embodiments are applicable in other types of communication systems, such as Wi-Fi or Wi-Max networks, Bluetooth or other personal-area networks (PANs), Zigbee or other home-area networks (HANs), wireless mesh networks, and the like, without limitation, unless expressly limited by a corresponding claim.

Given the benefit of the present disclosure, persons skilled in the relevant technologies will be able to engineer suitable variations to implement principles of the embodiments in other types of communication systems. For example, it will be understood that a base station or e-Node B (eNB) of a 3GPP context is analogous, generally speaking, to a wireless access point (AP) of a WLAN context. Likewise, user equipment (UE) of a 3GPP context is generally analogous to mobile stations (STAs) of WLANs. Various diverse embodiments may incorporate structural, logical, electrical, process, and other differences. Portions and features of some embodiments may be included in, or substituted for, those of other embodiments. Embodiments set forth in the claims encompass all presently-known, and after-arising, equivalents of those claims.

Figure 1:
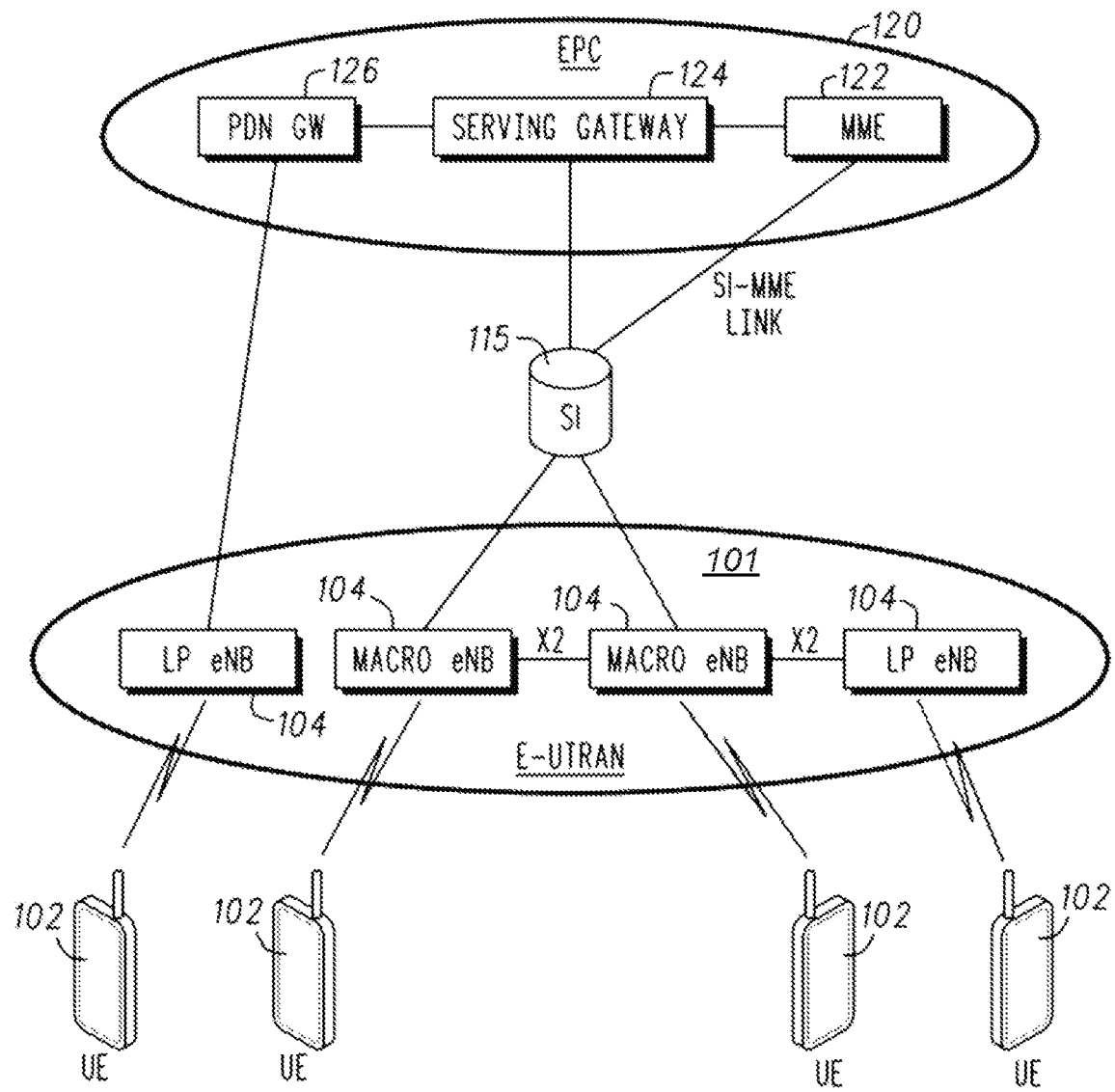
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 101 and the core network 120 (e.g., shown as an evolved packet core (EPC)) coupled together through an S1 interface 115. For convenience and brevity sake, only a portion of the core network 120, as well as the RAN 101, is shown.

The core network 120 includes a mobility management entity (MME) 122, a serving gateway (serving GW) 124, and packet data network gateway (PDN GW) 126. The RAN 101 includes Evolved Node-B's (eNB) 104 (which may operate as base stations) for communicating with User Equipment (UE) 102. The eNBs 104 may include macro eNBs and low power (LP) eNBs. In accordance with some embodiments, the eNB 104 may transmit a downlink control message to the UE 102 to indicate an allocation of physical uplink control channel (PUCCH) channel resources. The UE 102 may receive the downlink control message from the eNB 104, and may transmit an uplink control message to the eNB 104 in at least a portion of the PUCCH channel resources. These embodiments will be described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handoffs and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates a SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNB 104 (macro and micro) terminate the air interface protocol and may be the first point of contact for a UE 102. In some embodiments, an eNB 104 may fulfill various logical functions for the RAN 101 including but not limited to RNC (radio network controller functions) such as radio bearer management, uplink and downlink dynamic radio resource management and data packet scheduling, and mobility management. In accordance with embodiments, UE 102 may be configured to communicate with an eNB 104 over a multipath fading channel in accordance with an Orthogonal Frequency Division Multiple Access (OFDMA) communication technique. The OFDM signals may comprise a plurality of orthogonal subcarriers.

The S1 interface 115 is the interface that separates the RAN 101 and the EPC 120. It is split into two parts: the S1-U, which carries traffic data between the eNB 104 and the serving GW 124, and the S1-MME, which is a signaling interface between the eNB 104 and the MME 122. The X2 interface is the interface between eNB 104. The X2 interface comprises two parts, the X2-C and X2-U. The X2-C is the control plane interface between the eNB 104, while the X2-U is the user plane interface between the eNB 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements in the frequency domain and may represent the smallest quanta of resources that currently can be allocated. There are several different physical downlink channels that are conveyed using such resource blocks. With particular relevance to this disclosure, two of these physical downlink channels are the physical downlink shared channel and the physical down link control channel.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and hybrid automatic repeat request (HARQ) information related to the uplink shared channel Typically, downlink scheduling (e.g., assigning control and shared channel resource blocks to UE 102 within a cell) may be performed at the eNB 104 based on channel quality information fed back from the UE 102 to the eNB 104, and then the downlink resource assignment information may be sent to the UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of downlink control information (DCI) and the channel condition. There may be four or more different PDCCH formats defined in LTE with different numbers of CCEs (e.g., aggregation level, L=1, 2, 4, or 8).

As used herein, the term circuitry may refer to, be part of, or include an Application Specific Integrated Circuit (ASIC), an electronic circuit, a processor (shared, dedicated, or group), or memory (shared, dedicated, or group) that executes one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware or software.

Figure 2:
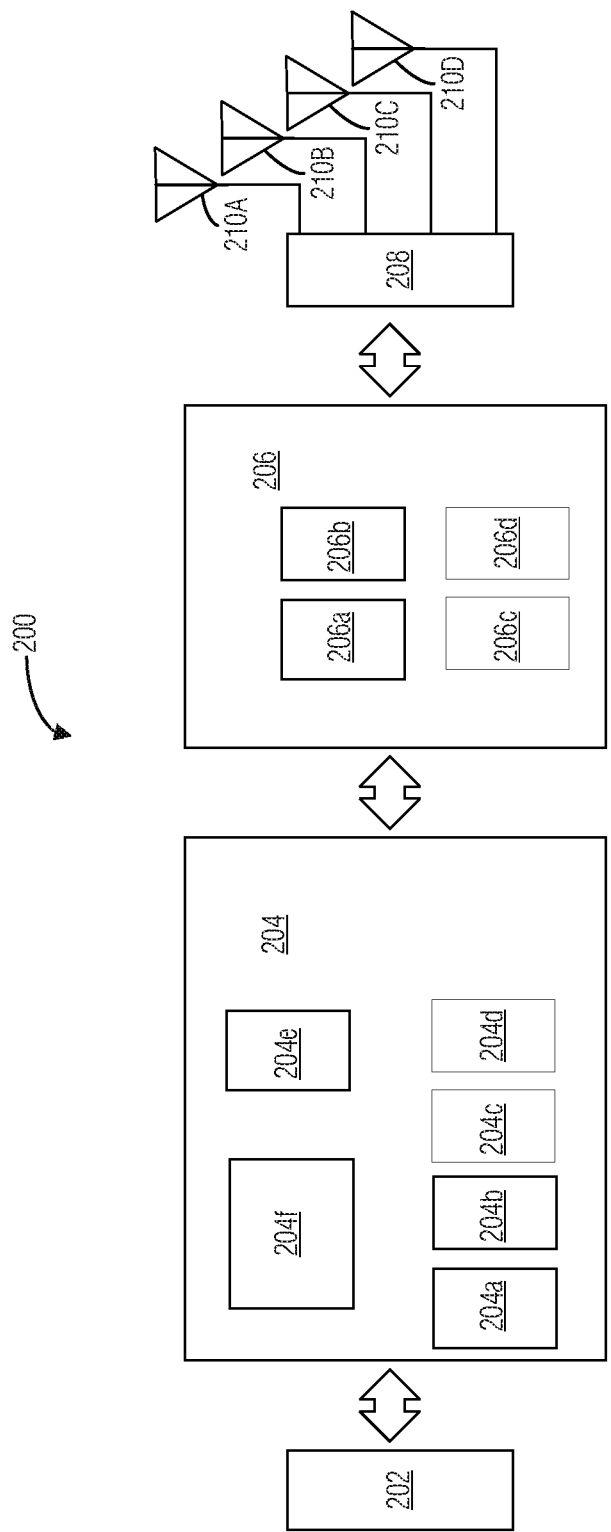
FIG. 2 is a block diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and multiple antennas 210A-210D, coupled together at least as shown. In some embodiments, other circuitry or arrangements may include one or more elements or components of the application circuitry 202, the baseband circuitry 204, the RF circuitry 206 or the FEM circuitry 208, and may also include other elements or components in some cases. As an example, "processing circuitry" may include one or more elements or components, some or all of which may be included in the application circuitry 202 or the baseband circuitry 204. As another example, "transceiver circuitry" may include one or more elements or components, some or all of which may be included in the RF circuitry 206 or the FEM circuitry 208. These examples are not limiting, however, as the processing circuitry or the transceiver circuitry may also include other elements or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the system.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), preceding, or constellation mapping/demapping functionality. In some embodiments, encoding/decoding circuitry of the baseband circuitry 204 may include Low Density Parity Check (LDPC) encoder/decoder functionality, optionally alongside other techniques such as, for example, block codes, convolutional codes, turbo codes, or the like, which may be used to support legacy protocols. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), or radio resource control (RRC) elements. A central processing unit (CPU) 204e of the baseband circuitry 204 may be configured to run elements of the protocol stack for signaling of the PHY, MAC, RLC, PDCP or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more of the antennas 210A-D, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210A-D.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, or input/output (I/O) interface.

Figure 3:
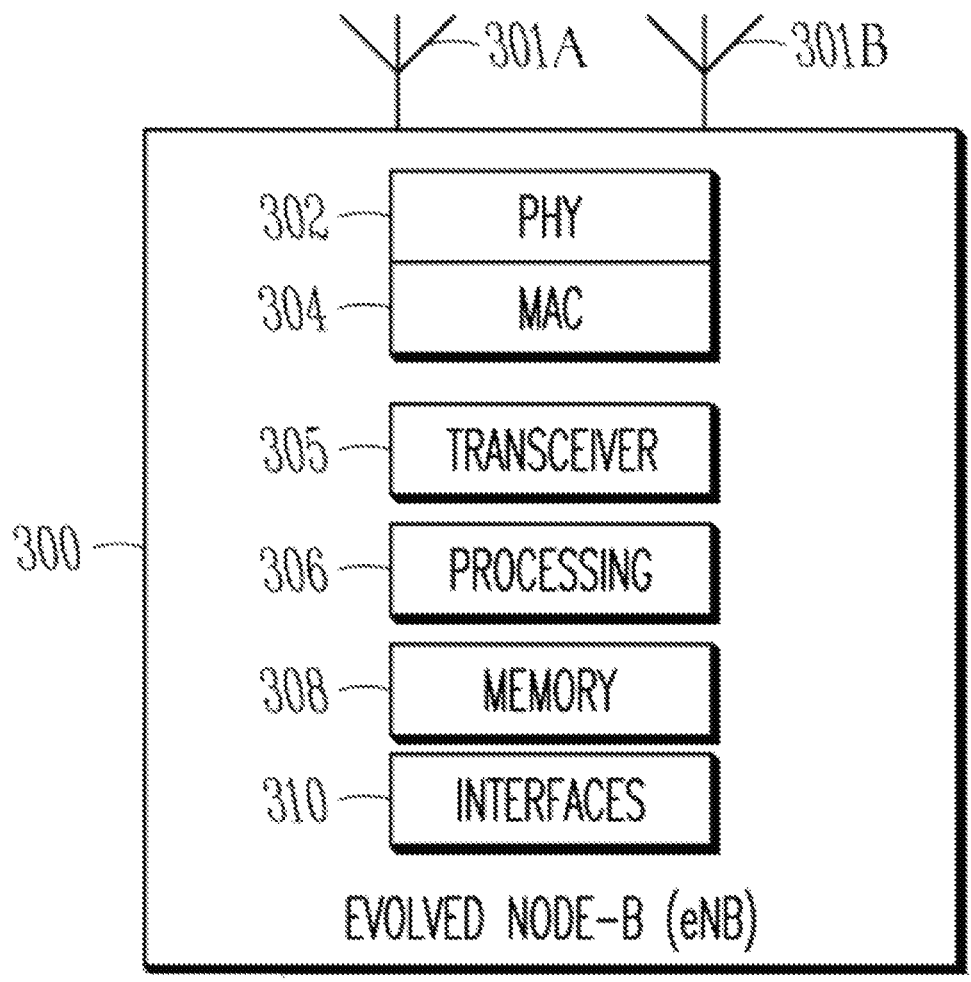
FIG. 3 is a block diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The components of eNB 300 may be included in a single device or a plurality of devices. The eNB 300 may include physical layer circuitry 302 and a transceiver 305, one or both of which may enable transmission and reception of signals to and from the UE 200, other eNBs, other UEs or other devices using one or more antennas 301A-B. As an example, the physical layer circuitry 302 may perform various encoding and decoding functions that may include formation of baseband signals for transmission and decoding of received signals. For example, physical layer circuitry 302 may include LDPC encoder/decoder functionality, optionally along-side other techniques such as, for example, block codes, convolutional codes, turbo codes, or the like, which may be used to support legacy protocols. Embodiments of modulation/demodulation and encoder/decoder functionality are not limited to these examples and may include other suitable functionality in other embodiments. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the described functionality related to transmission and reception of signals may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNB 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210A-D, 301A-B may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210A-D, 301A-B may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 or eNB 300 may include various components of the UE 200 or the eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

Figure 4:
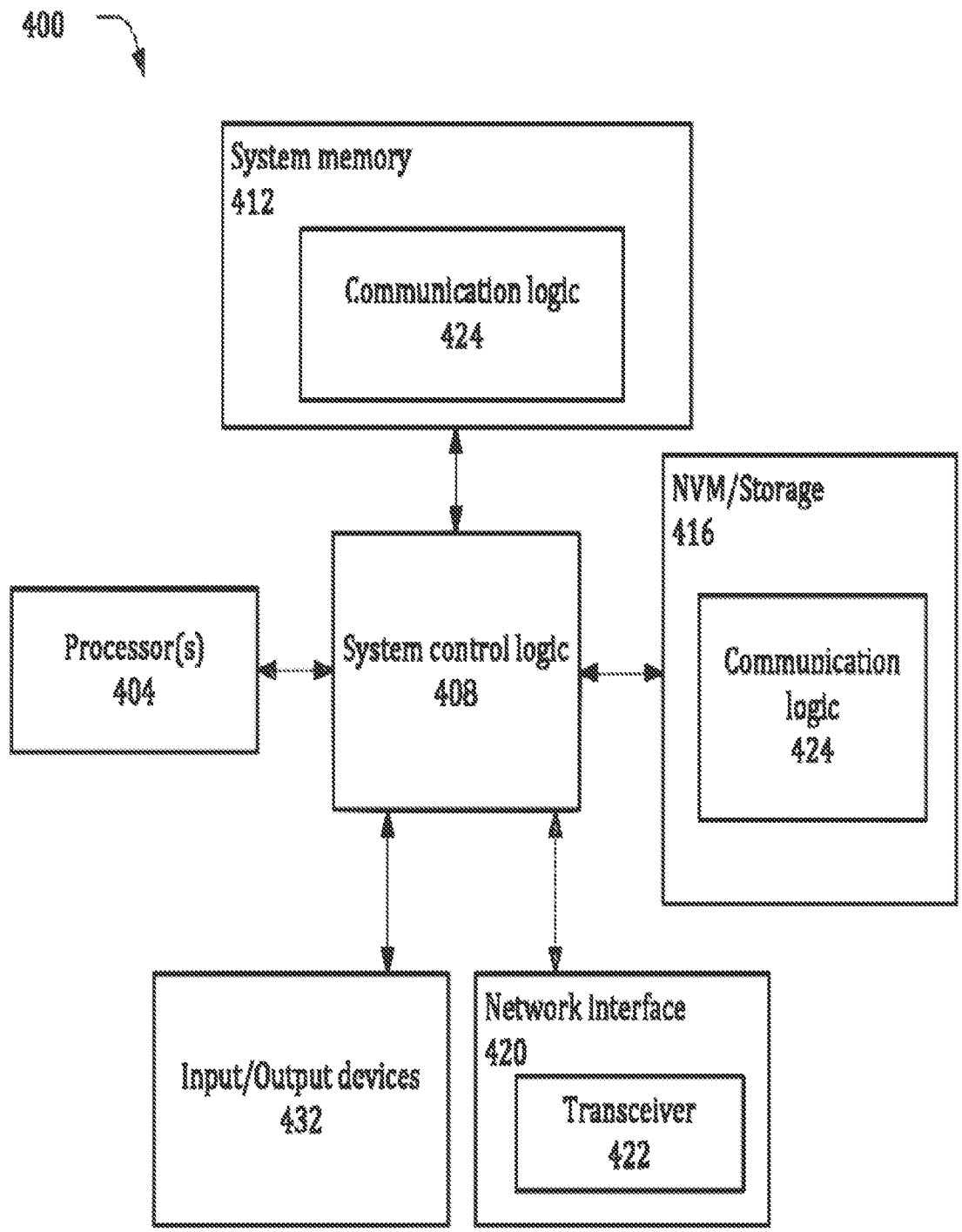
FIG. 4 illustrates an example processor-based computing platform according to some embodiments.

FIG. 4 illustrates an example processor-based computing platform according to some embodiments. As depicted, system 400 includes one or more processor(s) 404, system control logic 408 coupled with at least one of the processor(s) 404, system memory 412 coupled with system control logic 408, non-volatile memory (NVM)/storage 416 coupled with system control logic 408, a network interface 420 coupled with system control logic 408, and input/output (I/O) devices 432 coupled with system control logic 408.

The processor(s) 404 may include one or more single-core or multi-core processors. The processor(s) 404 may include any combination of general-purpose processors and dedicated processors (e.g., graphics processors, application processors, baseband processors, etc.).

System control logic 408 for one embodiment may include any suitable interface controllers to provide for any suitable interface to at least one of the processor(s) 404 and/or to any suitable device or component in communication with system control logic 408.

System control logic 408 for one embodiment may include one or more memory controller(s) to provide an interface to system memory 412. System memory 412 may be used to load and store data and/or instructions, e.g., communication logic 424. System memory 412 for one embodiment may include any suitable volatile memory, such as suitable dynamic random access memory (DRAM), for example.

NVM/storage 416 may include one or more tangible, non-transitory computer-readable media used to store data and/or instructions, e.g., communication logic 424. NVM/storage 416 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 416 may include a storage resource physically part of a device on which the system 400 is installed or it may be accessible by, but not necessarily a part of, the device. For example, the NVM/storage 416 may be accessed over a network via the network interface 420 and/or over Input/Output (I/O) devices 432.

The communication logic 424 may include instructions that, when executed by one or more of the processors 404, cause the system 400 to perform operations associated with the components of the communication device IRP manager 128, IRP agent 132, mapping circuitry 136 and/or the methods 200 or 300 as described with respect to the above embodiments. In various embodiments, the communication logic 424 may include hardware, software, and/or firmware components that may or may not be explicitly shown in system 400.

Network interface 420 may have a transceiver 422 to provide a radio interface for system 400 to communicate over one or more network(s) and/or with any other suitable device. In various embodiments, the transceiver 422 may be integrated with other components of system 400. For example, the transceiver 422 may include a processor of the processor(s) 404, memory of the system memory 412, and NVM/Storage of NVM/Storage 416. Network interface 420 may include any suitable hardware and/or firmware. Network interface 420 may include a plurality of antennas to provide a multiple input, multiple output radio interface. Network interface 420 for one embodiment may include, for example, a wired network adapter, a wireless network adapter, a telephone modem, and/or a wireless modem.

For one embodiment, at least one of the processor(s) 404 may be packaged together with logic for one or more controller(s) of system control logic 408. For one embodiment, at least one of the processor(s) 404 may be packaged together with logic for one or more controllers of system control logic 408 to form a System in Package (SiP). For one embodiment, at least one of the processor(s) 404 may be integrated on the same die with logic for one or more controller(s) of system control logic 408. For one embodiment, at least one of the processor(s) 404 may be integrated on the same die with logic for one or more controller(s) of system control logic 408 to form a System on Chip (SoC).

In various embodiments, the I/O devices 432 may include user interfaces designed to enable user interaction with the system 400, peripheral component interfaces designed to enable peripheral component interaction with the system 400, and/or sensors designed to determine environmental conditions and/or location information related to the system 400.

In various embodiments, the user interfaces could include, but are not limited to, a display (e.g., a liquid crystal display, a touch screen display, etc.), speakers, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, an Ethernet connection, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 420 to communicate with components of a positioning network, e.g., a global positioning system (GPS) satellite.

In various embodiments, the system 400 may be implemented on a server, or system of networked server machines. System 400 may also be virtualized in some embodiments on a host machine or on a set of host machines operating using distributed computing techniques. In other embodiments, system 400 may be implemented on one or more mobile computing devices such as, but not limited to, a laptop computing device, a tablet computing device, a netbook, a smartphone, etc. In various embodiments, system 400 may have more or less components, and/or different architectures.

Examples, as described herein, may include, or may operate on, logic or a number of components, engines, modules, or circuitry which for the sake of consistency are termed engines, although it will be understood that these terms may be used interchangeably. Engines may be hardware, software, or firmware communicatively coupled to one or more processors in order to carry out the operations described herein. Engines may be hardware engines, and as such engines may be considered tangible entities capable of performing specified operations and may be configured or arranged in a certain manner. In an example, circuits may be arranged (e.g., internally or with respect to external entities such as other circuits) in a specified manner as a engine. In an example, the whole or part of one or more hardware processors may be configured by firmware or software (e.g., instructions, an application portion, or an application) as a engine that operates to perform specified operations. In an example, the software may reside on a machine-readable medium. In an example, the software, when executed by the underlying hardware of the engine, causes the hardware to perform the specified operations. Accordingly, the term hardware engine is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein.

Considering examples in which engines are temporarily configured, each of the engines need not be instantiated at any one moment in time. For example, where the engines comprise a general-purpose hardware processor core configured using software; the general-purpose hardware processor core may be configured as respective different engines at different times. Software may accordingly configure a hardware processor core, for example, to constitute a particular engine at one instance of time and to constitute a different engine at a different instance of time.

FIG. 5 illustrates examples of multiple beam transmission in accordance with some embodiments. Although the example scenarios 500 and 550 depicted in FIG. 5 may illustrate some aspects of techniques disclosed herein, it will be understood that embodiments are not limited by example scenarios 500 and 550. Embodiments are not limited to the number or type of components shown in FIG. 5 and are also not limited to the number or arrangement of transmitted beams shown in FIG. 5.

In example scenario 500, the eNB 104 may transmit a signal on multiple beams 505-520, any or all of which may be received at the UE 102. It should be noted that the number of beams or transmission angles as shown are not limiting. As the beams 505-520 may be directional, transmitted energy from the beams 505-520 may be concentrated in the direction shown. Therefore, the UE 102 may not necessarily receive a significant amount of energy from beams 505 and 510 in some cases, due to the relative location of the UE 102.

UE 102 may receive a significant amount of energy from the beams 515 and 520 as shown. As an example, the beams 505-520 may be transmitted using different reference signals, and the UE 102 may determine channel-state information (CSI) feedback or other information for beams 515 and 520. In some embodiments, each of beams 505-520 are configured as CSI reference signals (CSI-RS). In related embodiments, the CSI-RS signal is a part of the discovery reference signaling (DRS) configuration. The DRS configuration may serve to inform the UE 102 about the physical resources (e.g., subframes, subcarriers) on which the CSI-RS signal will be found. In related embodiments, the UE 102 is further informed about any scrambling sequences that are to be applied for CSI-RS.

In some embodiments, up to 2 MIMO layers may be transmitted within each beam by using different polarizations. More than 2 MIMO layers may be transmitted by using multiple beams. In related embodiments, the UE is configured to discover the available beams and report those discovered beams to the eNB prior to the MIMO data transmissions using suitable reporting messaging, such as channel-state reports (CSR), for example. Based on the reporting messaging, the eNB 104 may determine suitable beam directions for the MIMO layers to be used for data communications with the UE 102. In various embodiments, there may be up to 2, 4, 8, 16, 32, or more MIMO layers, depending on the number of MIMO layers that are supported by the eNB 104 and UE 102. In a given scenario, the number of MIMO layers that may actually be used will depend on the quality of the signaling received at the UE 102, and the availability of reflected beams arriving at diverse angles at the UE 102 such that the UE 102 may discriminate the data carried on the separate beams.

In the example scenario 550, the UE 102 may determine angles or other information (such as CSI feedback, channel-quality indicator (CQI) or other) for the beams 565 and 570. The UE 102 may also determine such information when received at other angles, such as the illustrated beams 575 and 580. The beams 575 and 580 are demarcated using a dotted line configuration to indicate that they may not necessarily be transmitted at those angles, but that the UE 102 may determine the beam directions of beams 575 and 580 using such techniques as receive beamforming, as receive directions. This situation may occur, for example, when a transmitted beam reflects from an object in the vicinity of the UE 102, and arrives at the UE 102 according to its reflected, rather than incident, angle.

In some embodiments, the UE 102 may transmit one or more channel state information (CSI) messages to the eNB 104 as reporting messaging. Embodiments are not limited to dedicated CSI messaging, however, as the UE 102 may include relevant reporting information in control messages or other types of messages that may or may not be dedicated for communication of the CSI-type information.

As an example, the first signal received from the first eNB 104 may include a first directional beam based at least partly on a first CSI-RS signal and a second directional beam based at least partly on a second CSI-RS signal. The UE 102 may determine a rank indicator (RI) for the first CSI-RS and an RI for the second CSI-RS, and may transmit both RIs in the CSI messages. In addition, the UE 102 may determine one or more RIs for the second signal, and may also include them in the CSI messages in some cases. In some embodiments, the UE 102 may also determine a CQI, a precoding matrix indicator (PMI), receive angles or other information for one or both of the first and second signals. Such information may be included, along with one or more RIs, in the one or more CSI messages. In some embodiments, the UE 102 performs reference signal receive power (RSRP) measurement, received signal strength indication (RSSI) measurement, reference signal receive quality (RSRQ) measurement, or some combination of these using CSI-RS signals.

Figure 6:
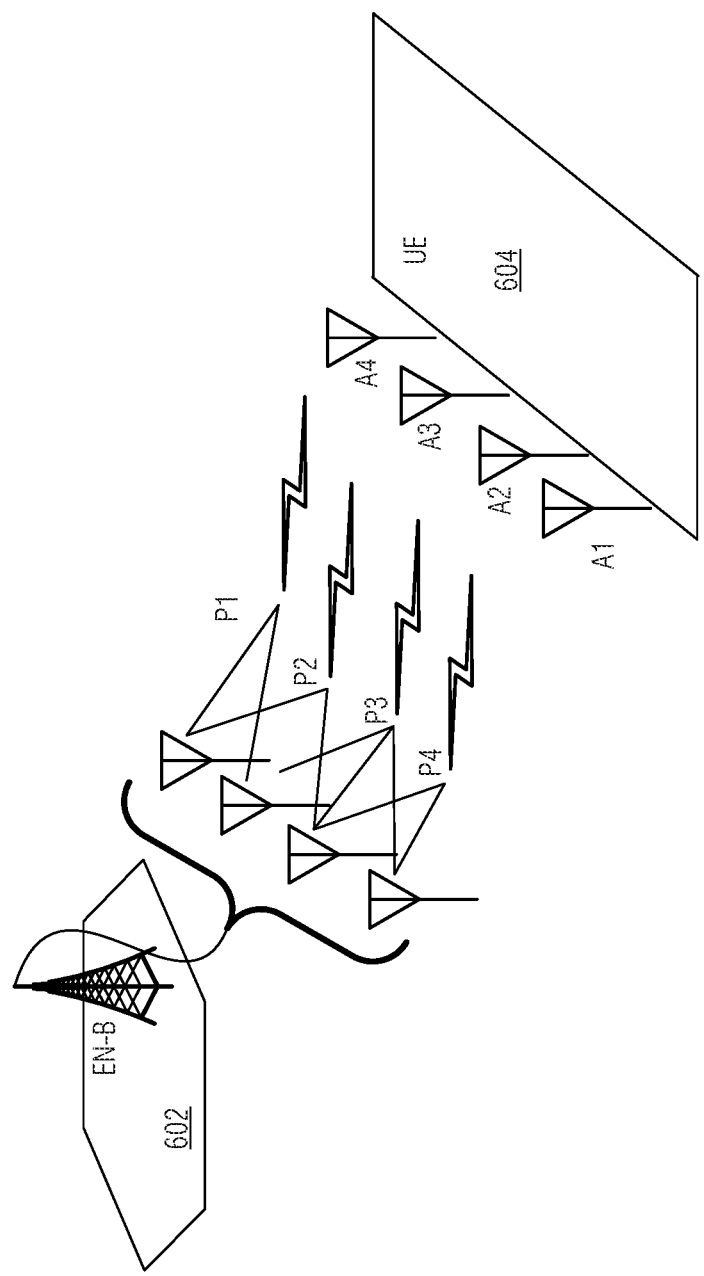
FIG. 6 is a diagram illustrating a MIMO transmission scenario utilizing an eNB and a UE, each having multiple antennas according to some embodiments.

FIG. 6 is a diagram illustrating a MIMO transmission scenario utilizing an eNB and a UE, each having multiple antennas according to some embodiments. eNB 602 has multiple antennas, as depicted, which may be used in various groupings, and with various signal modifications for each grouping, to effectively produce a plurality of antenna ports P1-P4. In various embodiments within the framework of the illustrated example, each antenna port P1-P4 may be defined for 1, 2, 3, or 4 antennas. Each antenna port P1-P4 may correspond to a different transmission signal direction. Using the different antenna ports, eNB 602 may transmit multiple layers with codebook-based or non-codebook-based precoding techniques. According to some embodiments, each antenna port corresponds to a beam antenna port-specific CSI-RS signals are transmitted at via respective antenna port. In other embodiments, there may be more, or fewer, antenna ports available at the eNB than the four antenna ports as illustrated in FIG. 6.

On the UE side, there are a plurality of receive antennas. As illustrated in the example of FIG. 6, there four receive antennas, A1-A4. The multiple receive antennas may be used selectively to create receive beam forming. Receive beam forming may be used advantageously to increase the receive antenna gain for the direction(s) on which desired signals are received, and to suppress interference from neighboring cells, provided of course that the interference is received along different directions than the desired signals.

In various embodiments, beamforming, beam selection, and MIMO operations may be performed at eNB 300 by processing circuitry 306, transceiver circuitry 305, or some combination of these facilities. Likewise, in various embodiments, the beamforming, beam selection, and MIMO operations may be performed at UE 200 by application circuitry 202, baseband circuitry 204, Radio Frequency (RF) circuitry 206, or some combination of these facilities. In related embodiments, certain beam selection operations may be performed using distributed computing techniques, where certain information storage or processing operations are handled with the assistance of an external device, such as eNB 300, UE 200, or system 400.

In millimeter-wave communications system embodiments, highly directional transmission and reception techniques are employed using multiple antenna arrays and beamforming. In these embodiments, whenever a UE or wishes to connect with an eNB, the eNB would conventionally perform a sector sweep or sector scan (collectively, "SS") operation where various beam directions are sequentially tested in some order until a suitable beam direction is found. Further optimization may be performed to improve the signal quality, adjust for movement of the UE, adjust for the movement of obstructing objects or other factors that impact the millimeter-wave beam propagation. In the present context, the terms sector sweep, and sector scan are used, sometimes interchangeably, with a distinction in their meanings being that a sector sweep proceeds in a spatially-consecutive fashion, such as clock-wise or counter-clock-wise, whereas a sector scan may be disjointed, e.g., not necessarily performed in a spatially-consecutive fashion, although it may be in whole or in part.

Transmit sector sweep (TXSS) is used to determine a suitable beam direction for transmission at the eNB, whereas receive sector sweep (RXSS) is used to determine a suitable beam direction for reception at the UE. SS may also be used after a UE transitions operating modes from an idle mode to active mode after a prolonged duration of time. Because SS is an iterative process, it typically takes a number of attempts to find a suitable beam direction.

The short wavelengths of millimeter-wave communications makes it possible to deploy an antenna array having dozens of antenna elements to provide high gain, directionality, and narrow beam width. Given the high degree of directionality in millimeter-wave systems (e.g., using such techniques as digital codebook-based beamforming, analog beamforming, or some combination of the two classes of beamforming techniques) the operational scenario presents a large number of possible sectors, or beam directions, to test in a sector-sweep operation. As such, the conventional sector sweep operation introduces latency in achieving the connection between the UE and eNB. The latency may be observed in the initial acquisition, and in the idle-to-active mode transition. Some aspects of the embodiments are directed to improving upon the sector-sweep operation to reduce latency. In the present context, the term sector may be used interchangeably with the term beam direction. In addition, just as a beam may have a relatively narrower, or relatively wider radiation pattern, so too may a sector have a variable width.

In related embodiments, single-user MIMO (SU-MIMO) operation may be conducted using a plurality of beams to communicate between an eNB and a given individual UE. In this type of embodiment, the sector sweep may be used to determine multiple suitable beam directions for simultaneous use with that UE.

According to some embodiments, a framework for prioritizing the order of sector scanning is provided, so as to reduce the latency required to find a sufficient beam direction or, in some cases, an optimal beam direction. In one example, a location-aware sector ordering process is implemented, in which the ordering of the sector scan is based on the location of the UE seeking to connect to the eNB. In a related embodiment, additional context information pertaining to the orientation, form-factor, mode of use, or other operational parameter of the UE is further taken into account in determining the sector scan priority ordering.

In a related embodiment, a machine-learning technique is applied to enable an eNB or UE to map predicted beam directions to various locations where suitable beam directions have been learned, and to propagate the map through the network for the benefit of the UE devices. In another related embodiment, a location-sector mapping data structure is generated, and used to facilitate sector scanning prioritization. The location-sector mapping may further be shared among different UEs, eNBs, or other devices, to further facilitate low-latency network connectivity.

FIG. 7A-7D are diagrams illustrating various sector scanning operations for transmit beamforming according to some aspects of the embodiments. In each of these diagrams, eNB 702 is depicted, along with sectors, or beam directions 712. In a sector scanning operation, different beam directions are tested for transmission. A receiving device such as a UE (not shown) may be configured to receive signaling along some of beam directions using an omnidirectional reception mode. The receiving device responds to receipt of any of the transmitted signals with an indication of a measure of performance, such as RSSI, RSRP, RSRQ, data-transfer rate, bit-error rate, or the like. Based on this feedback, a sufficient, or optimal, transmit beam direction may be selected for ongoing communication with that particular UE. Later, the UE may perform receive beam forming to increase the receive signal gain and improve upon the UE's rejection of incoming interference along directions other than the receive-beam direction.

In the present context, a sufficient beam direction is one that meets a defined performance criterion. An optimal beam direction is one that is in a range of performance determined to be superior among various other beam directions that have been tested. Notably, an optimal beam direction is also sufficient, though a sufficient beam direction may or may not be optimal. Also, notably, an optimal beam direction in the present context is not necessarily beam direction with the best achievable performance; rather, it has a performance that meets selective criteria. Practically speaking, in some embodiments (as will be described in greater detail below), the effect of a beam direction having been determined to be optimal, or sufficient but sub-optimal, drives the urgency of performing beam-direction optimization.

Figure 7B:
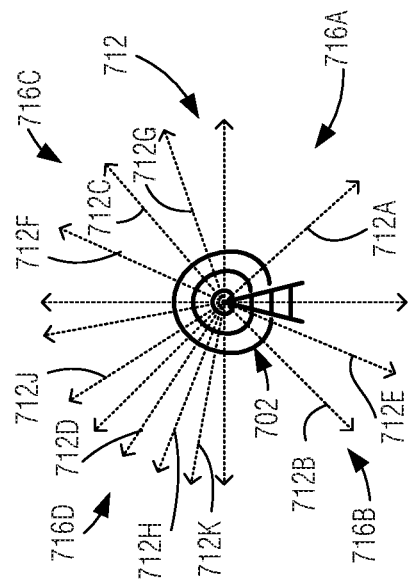
FIG. 7A-7D are diagrams illustrating various sector scanning operations for transmit beamforming according to some aspects of the embodiments.
Figure 7D:
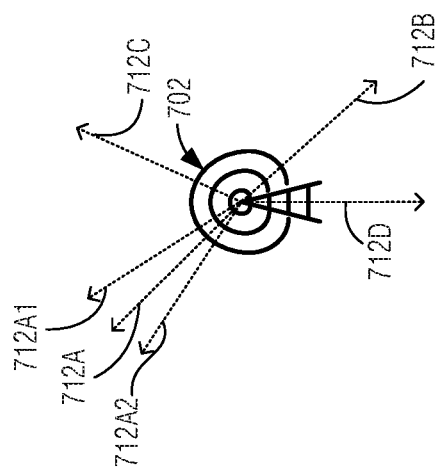
Figure 7A:
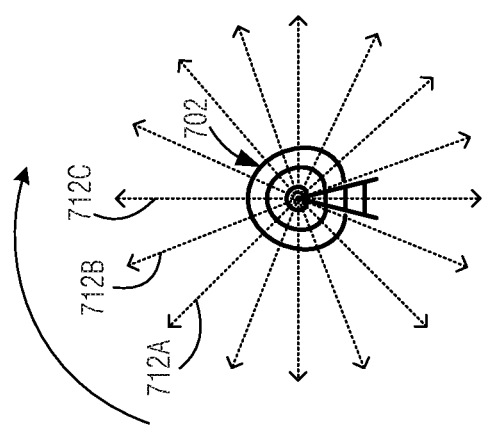

FIG. 7A illustrates a sequential sector sweep procedure in which beam directions 712A, 712B, 712C, etc., are selected sequentially according to a default starting beam direction (e.g., 712A), and proceeding along a predetermined sequence, in a round-robin fashion. This example represents a conventional sector sweep that introduces significant latency as a large number of beam directions are tested to find a sufficient or optimal beam direction.

FIG. 7B is a diagram illustrating an iterative approach to selecting a beam direction according to some embodiments. As depicted, zones 716A-716D represent coarse directions for generally wider beams 712. A sector scan may proceed as follows. First, test representative beam directions 712 for each zone 716A-D. For instance, beam direction 712A for zone 716A, beam direction 712B for zone 716B, and so on. Next, based on the performance measure feedback obtained for each zone 716, additional, narrower, beam directions 712 may be tested within each zone. The number and priority ordering of these finer measurements may be selected for each zone 716 based on the zone's relative performance from the prior round of measurements. Thus, for instance, in the example case where zone 716A has the worst performance, followed by zone 716B, then zone 716C, and finally zone 716D with the best performance, further beam directions for zone 716A may be omitted in the follow-on sector-scanning iteration; beam direction 712E may be tested for zone 716B; beam directions 712F and 712G may be tested for zone 716C; and beam directions 712 H, 712J, and 712K may be tested for zone 716D. In a related embodiment, the second-iteration measurement may preferentially begin with zone 716D since a sufficient or optimal beam direction is more likely to be found in this higher-performing zone.

Figure 7C:
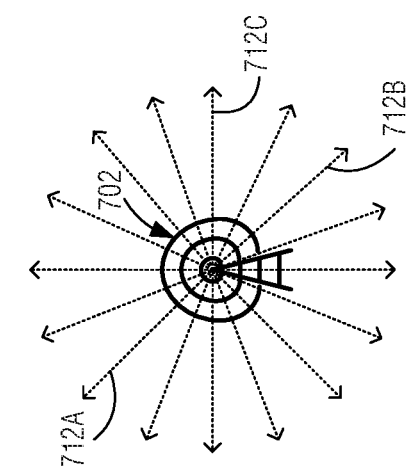

FIG. 7C depicts a selective sector scan procedure according to some embodiments in which selected beam directions 712A, 712B, and 712C are tested in a particular order that is based on a location of the device receiving the beams. For instance, based on a reported UE location, eNB 702 may preferentially select a beam direction, or a set of beam directions, to test for connectivity and performance, from among all possible beam directions. This selection may be determined from statistical data gathered previously from the particular UE with which the current connection is being made, or from other UEs situated at or near the location of the current UE. As depicted, beam directions 712A, 712B, and 712C may be non-similar directions.

FIG. 7D illustrates an example scenario according to some embodiments in which beam direction selection is performed based on statistical data as in the example of FIG. 7C, with the addition of iterative optimization. Here, a preferentially-selected beam direction 712A is selected first, based on prior information pertaining to the reported location of the UE. With the understanding that the reported UE position may have some inaccuracy or variability, and that there may be other signal-propagation variability due to weather, device form factor, device mode of use, etc., additional, similar, beam directions 712A1 and 712A2, referred to herein as beam-refinement selections, are tested following the testing of selected beam direction 712A. Beam directions 712B, 712C, and 712D may also be selected based on the statistical data, and tested. In various embodiments, beam-refinement selections 712A1 and 712A2 are tested immediately after the testing of initial beam direction 712A. In another embodiment, the beam-refinement selections 712A1 and 712A2 are tested after other statistics-based beam direction selections 712B, 712C, and 712D are tested.

FIG. 8 is a graph illustrating an example set of performance measure values for various beam directions, along with sufficiency and optimal thresholds, according to some embodiments. As illustrated, the performance measure values are graphed in the vertical axis 802 for various beam directions A-J as indicated. According to various embodiments, the performance measure may be a measure of signal strength, received signal power, or quality, such as RSSI, RSRP, RSRQ, signal too interference noise ratio (SINR), or the like. The performance measure may also include a measure of data transfer rate, bit-error rate, or the like. The illustrated set of values may be a result set gathered by operation of a sector scan process according to some embodiments. According to a related embodiment, a technique for reducing sector-scan-associated latency and for optimizing beam direction selection is implemented using a set of thresholds and automated decisions.

According to an example embodiment, a sufficiency threshold 810 is applied to identify beam directions having a performance measure that is minimally suitable for use in establishing connectivity between an eNB and a UE. Beam directions for which the performance measure falls below sufficiency threshold 810, e.g., C, D, E, and H of the present example, may be immediately dismissed from consideration for use in connecting with the UE in its present position, and these beam directions may be tagged or otherwise logged as being insufficient for use with UEs located at the present location of the UE with which the performance measure is obtained. Beam directions for which the performance measure exceeds sufficiency threshold 810 may be used for establishing an initial connection with the UE, and may be further tagged or otherwise logged as having its sufficient performance level.

In a related embodiment, following establishment of the initial connection, and depending on the degree of measured performance, further beam-direction refinement or optimization may be performed relatively sooner, or relatively later. In one such approach, optimization threshold 812 is applied to test whether a given beam direction's performance measure is within an optimal range. As depicted, optimization threshold 812 is higher than sufficiency threshold 810, but is not necessarily set at the maximum achievable performance level. Accordingly, there is a range of values of the performance measure that may be deemed optimal according to this embodiment.

In one such approach, a selected beam direction having a performance measure exceeding sufficiency threshold 810 but falling short of optimization threshold 812 is used for establishing an initial connection (e.g., the sector scan may be completed or postponed), but further optimization may be called for relatively sooner (e.g., within a defined first time interval) to try to improve the data-communications performance. The further optimization may include performing a sector scan operation. For a selected beam direction having a performance measure that exceeds optimization threshold 812, the initial connection may be established, and maintained, for a relatively longer period before further optimization is called for. For instance, a defined second time interval that is longer than the first time interval may be applied to postpone further sector scanning, thereby preserving resource elements for other uses besides sector scanning.

Figure 9A:
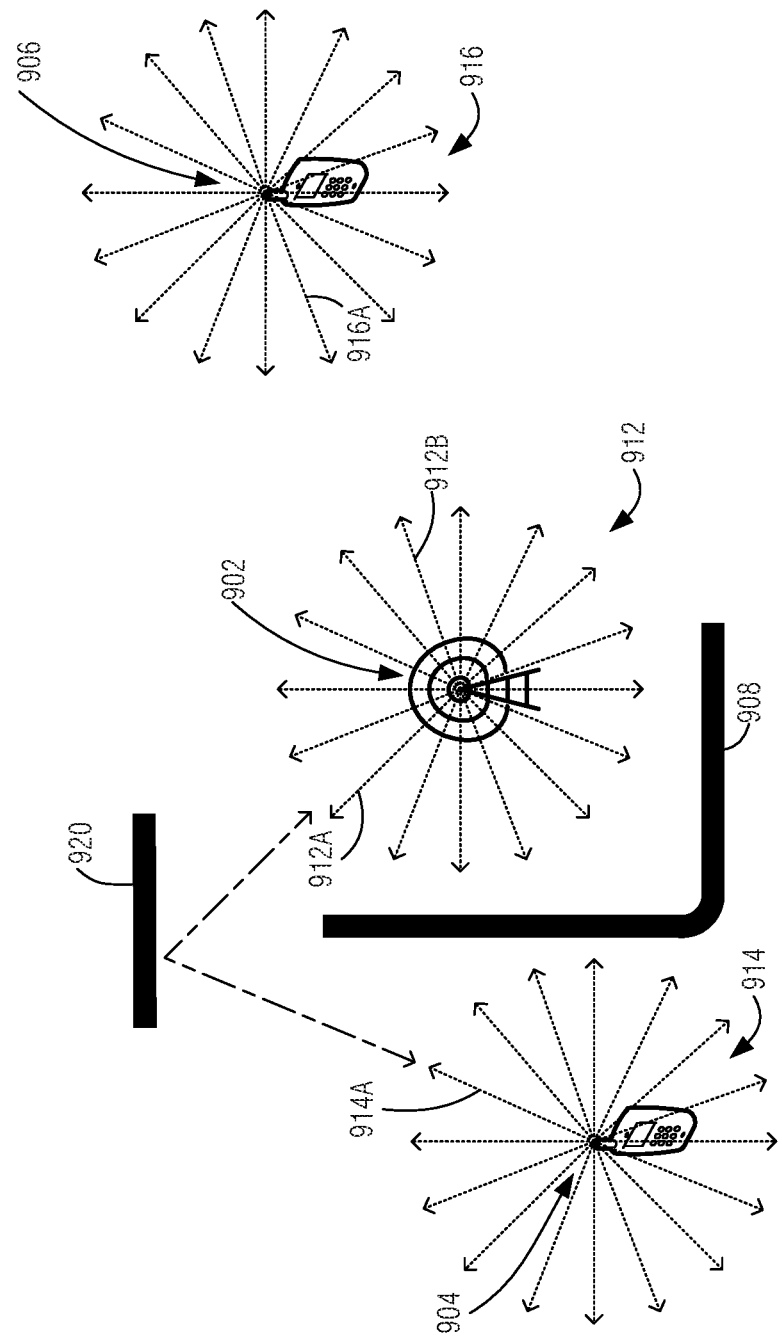
FIG. 9A is a spatial diagram illustrating an example use case in which an eNB communicates with various UEs according to some embodiments.

FIG. 9A is a spatial diagram illustrating an example use case in which an eNB communicates with various UEs according to some embodiments. As depicted, eNB 902 is within communication range of UE 904 and UE 906, but general data communications established between eNB 902 and each of the UEs 904, 906 is conducted via directional downlink transmit beams 912 transmitted by eNB 902, and directional uplink transmit beams 914 transmitted by UE 904 and 916 transmitted by UE 906.

In general, to establish a connection, different beam directions 912, 914, and 916 are tested, respectively, by each transmitting device (eNB 902 in the downlink, and UEs 904 and 906 in the uplink). Suitable beam directions, whether optimal, or merely sufficient, are determined using sector sweeping or sector scanning according to processes such as those discussed above with reference to FIGS. 7A-7B. In some embodiments, SU-MIMO is supported with multiple beam directions being determined for a given UE 904, 906 to be used simultaneously.

In determining the suitable bean directions for downlink communications, eNB 902 receives feedback information from each UE 904, 906 indicating the performance measure associated with each tested downlink beam direction that is measurable by the UE 904, 906. In addition to the performance-measure reporting, each UE 904, 906 reports its location to eNB 902. In response to the location and performance-measure information, eNB 902 stores a record containing the performance measure in association with the beam direction used, and the UE location from which the performance measure was gathered.

In a related embodiment, each UE 904, 906 performs similar record storage of eNB identifier associated with uplink beam direction, performance-measure feedback received, and UE location. In a related aspect of the embodiments, UEs 804 and 906 may share their respective location-beam direction records via an intermediary device (such as eNB 902, for instance, or a different device), or via peer-peer communications.

In one type of implementation, each transmitting device, i.e., eNB 902 or UE 904, 906 maintains its beam direction-performance-location records locally. In a related embodiment, the records are maintained remotely from the transmitting device. For instance, each UE 904, 906 may rely on eNB 902 to store their respective uplink beam direction-performance-location records. The eNB 902, or UEs 904, 906 may also have their records maintained at a different device on the network.

To illustrate, eNB 902 and UEs 904, 906 may cooperate to test various beam directions for downlink and uplink transmissions, respectively. As depicted, downlink beam direction 912B, having a line-of-sight propagation path to UE 906, may be determined as producing sufficient or optimal performance. However, obstruction 908 prevents a line-of-site propagation path for communications with UE 906. In this example, beam direction 912A, which produces a reflection from structure or object 920, is determined to produce sufficient or optimal performance. For uplink beam directions, line-of-sight beam direction 916A for UE 906 may be selected following a sector scan procedure that finds this beam direction to be sufficient or optimal. For UE 904, since a line-of-sight beam direction is obstructed, beam direction 914A is found to provide sufficient or optimal performance.

Each device, eNB 902, and UEs 904, 906 may store a record of the selected beam direction for downlink or uplink transmission, in association with at least the corresponding location of the UE receiving the downlink, or sending the uplink, as the case may be. In a related embodiment, the record may be shared with one or more other devices to disseminate the UE location-beam direction know-how.

In a related embodiment, in addition to determining the first sufficient beam direction or the optimal beam direction, other suitable beam directions may be found by eNB 902 or UEs 904, 906. These other beam directions may be recorded for future reference along with the selected beam direction. Advantageously, if usage of the first selected beam direction encounters a problem, such as a new obstruction, for instance, one of the recorded other beam directions may be selected without having to undertake a sector scanning operation. In a related embodiment, an ordering of preference for a group of beam directions is stored based on the measured performance of those beam directions. Notably, the group of beam directions may be a subset of the full set of beam directions that the eNB or UE may steer transmissions A variety of techniques for determining a UE's location are contemplated. For example, in outdoor environments, or other environments that do not obstruct global positioning system (GPS) signal reception, GPS may be used to determine the location. Indoors, or in environments where GPS is unavailable with sufficient accuracy, any other suitable location-determining technique may be used. For example, terrestrial-network-based trilateration using less-sensitive radio bands (e.g., 900 MHz, 2 GHz, 5 GHz, etc.) may be utilized for locating a UE. In addition, an inertial-navigation technique using accelerometer and optionally, compass, sensors, in combination with location fixes using GPS, terrestrial radio-location or other mode may be utilized. In another example indoor trilateration using reception of infrared signaling produced by emitters placed at known points throughout an interior space, may be used for precise location.

In a related embodiment, in addition to location information gathered for the UEs, UE orientation information may also be gathered. UE orientation information may be used to normalize the beam direction reference coordinates so that UEs transmitting uplink signaling can correct select an appropriate beam direction relative to the fixed location of the eNB, rather than being relative to the body of the UE. UE orientation information may also be relevant where, due to a UE's construction, or mode of use, the antenna gain may not be uniform over different reception and transmission beam directions.

In another related embodiment, information regarding UE device type, or form factor, may be provided with location or UE orientation information. For instance, the UE may be a smartphone, tablet, notebook PC, wearable device such as smart glasses, smartwatch, or the like, each type having certain physical features that may help or hinder millimeter-wave RF radiation.

In another related embodiment, UE usage context information may be provided with location, UE orientation, or UE device type information. Usage context information may include such details as whether a UE is in motion, whether a UE is held against a user's ear, whether a UE is worn, etc.

Orientation, device type, and usage context information may be used, in various combinations, to normalize the performance-measure information across different device orientations, device types, and usage contexts, such that location-beam direction information from different device types or usage contexts may be compared fairly. For instance, in the case where the location, orientation, and usage context information provides information from which a determination may be made that the user of the UE is positioned between the antenna of the UE and the eNB, a normalization operation may infer that the signal is attenuated by the presence of the user's body and, accordingly, the measured performance value may be increased by a correction factor to counteract the supposed attenuation.

In a related embodiment, a location-beam direction mapping data structure (hereinafter, the "beam-finding map") is utilized to facilitate fast beam selection based on UE location and, implicitly, the eNB location within the map coverage area. In one type of embodiment, the beam-finding map is a 2-dimensional map representing positioning within a single horizontal plane, whereas in another type of embodiment the beam-finding map is a 3-dimensional map that additionally takes into account the elevation of the UEs.

Figure 9B:
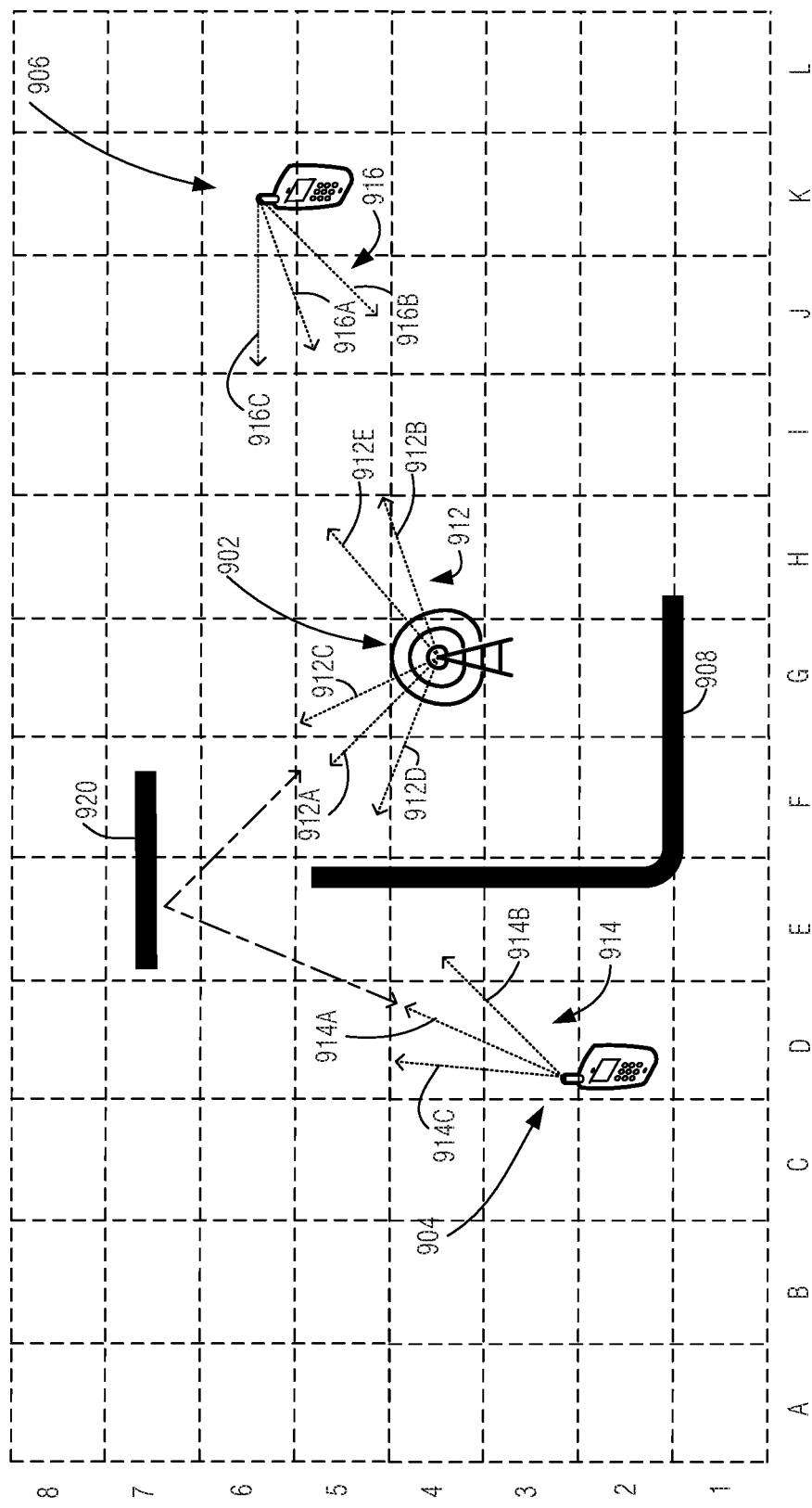
FIG. 9B is a diagram illustrating an example operational scenario in which beam-finding maps are built according to some embodiments.

FIG. 9B is a diagram illustrating an example operational scenario in which beam-finding maps are built according to some embodiments. Evolved node-B 902, and UEs 904, 906 may create beam-finding maps based on the sector scans performed with transmission in beam directions 912, 914, and 916. In the embodiment depicted, the locations of UEs 904 and 906 are referenced to a predefined grid A1, A2, . . . B1, B2, . . . L7, L8. As shown in this example for the sake of clarity, the grid is two-dimensional, though in other examples the location may also specify an elevation component, thereby making that map three-dimensional. In an example embodiment, the determined location for UE 904, 906 is quantized to the grid. Accordingly, close-proximity UEs within the same grid element (but otherwise at distinct positions) will report the same location corresponding to the grid element.

As depicted in the illustrative example, groups of beam directions have been determined as being suitable for use (e.g., optimal or at least sufficient), in order of preference. For the downlink to UE 904, eNB 902 has determined that beam directions 912A, 912C and 912D are suitable, with beam direction 912A as being the preferred direction, with beam direction 912C, followed by 912D as being the second- and third-best beam directions, respectively. For downlink communications with UE 906, beam directions 912B and 912E have been determined as being suitable, with beam direction 912B being the most preferred, followed by beam direction 912E.

For the uplink transmissions from UEs 904, 906, similar types of beam-direction selections and priority-ordering may be determined. UE 904 has determined that beam directions 914A, 914B, and 914C are suitable for use in uplink transmissions, in prioritized order. UE 906 has determined that beam directions 916A, 916B, and 916C are suitable for use for uplink transmissions, in prioritized order.

In one type of embodiment, each device, eNB 902 and UEs 904, 906, compiles location-beam direction data based on suitable beam directions found at each of one or more locations to form a beam-finding map. The beam-finding map may be stored in any suitable data-structure format (e.g., list, table, array, relational database, etc.). When an uplink or downlink connection is to be established, the beam-finding map may be read to look up suitable beam directions corresponding to the current location, if such entries exist.

According to some embodiments, the beam-finding map is formed using a machine-learning technique. In an example, support vector machine (SVM) is used to this end. In an example embodiment, given m training samples, $(x_i, y_i)$, where $I=1 \ldots m$, and with $x_i$ representing the location and $y_i$ representing the indicator for the best beam direction, the objective is to solve the equation $$\min J(\theta) = \Sigma_{i=1}^m \cos t(\theta'x^i) + \Sigma\theta^2,$$

where $\cos t(z) = \max(0, 1+z)$ if $y=0$, i.e. $\cos t(z)=0$ if $z<-1$ $\cos t(z) = \max(0, 1-z)$ if $y=1$, i.e. $\cos t(z)=0$ if $z>1$ After obtaining the θ that optimize the above solution for each beam direction, a hypothesis function is constructed as $h=\theta'x$. The probability for a beam direction to be the best beam direction is proportional to the corresponding h value. Therefore, the final map may be obtained by ordering the beam directions in order of their h values. For example, if h for a given location for 4 different beam directions {a, b, c, d} is {1.5, 3.5. 2.6, 0.5}, the map for the location and sector scan order is b, c, a, d.

Figure 10:
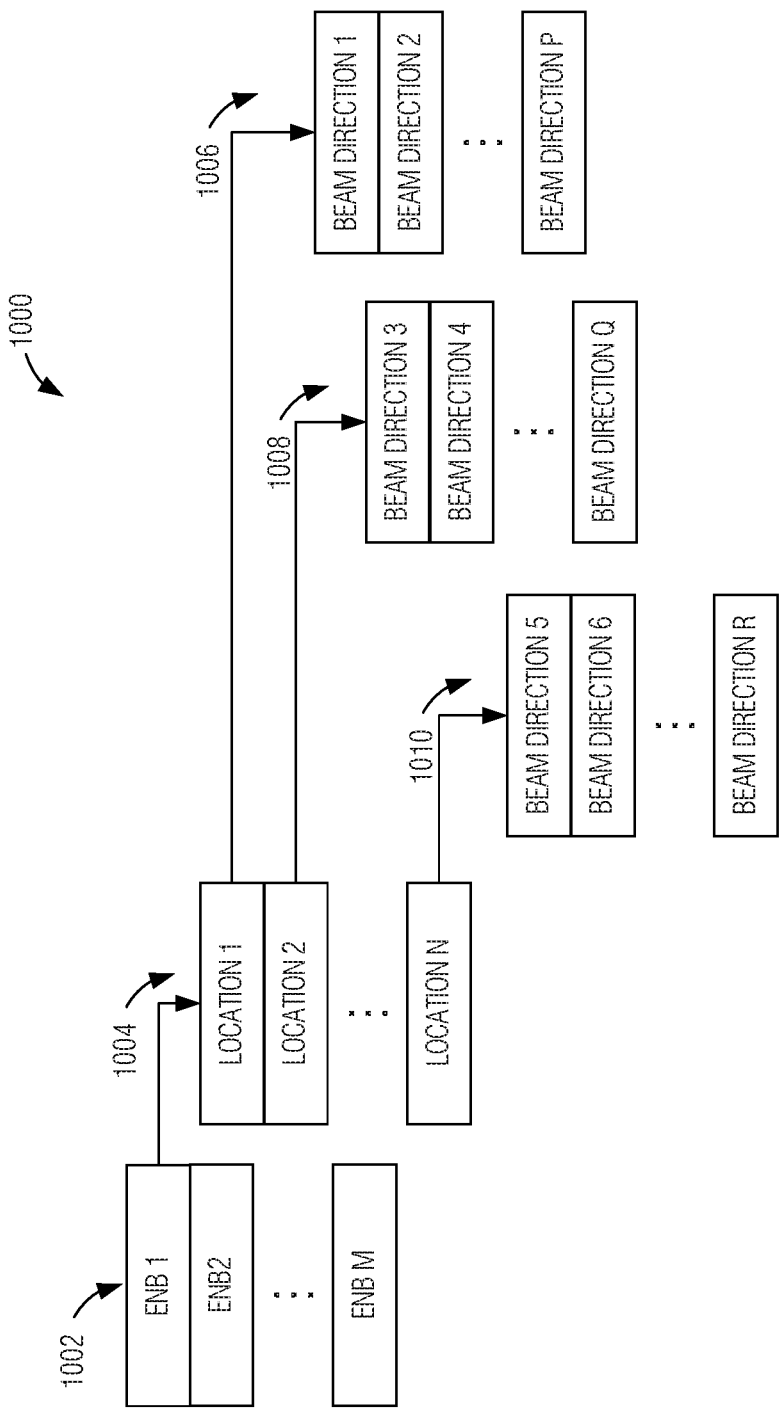
FIG. 10 is a diagram illustrating an example data structure of a beam-finding map according to an embodiment.

FIG. 10 is a diagram illustrating an example data structure of a beam-finding map according to an embodiment. As illustrated, data structure 1000 includes eNB attribute 1002 that contains fields representing one or more eNBs 1, eNB 2, . . . , eNB M, to which the location and beam direction attributes pertain. E-node B attribute 1002 may be implicit in the case where eNB 902 maintains data structure 1000 for its own use. In some embodiments, UEs may maintain location-beam direction associations for multiple eNBs or base stations, particularly when located at a boundary between service areas supported by different eNBs or base stations, or in the case of an eNB supporting multiple small cells, or LTE-WLAN aggregation (LWA) networks. In the embodiment depicted, each field of eNB attribute 1002 has a one-to-many relationship with fields of location attribute 1004.

Location attribute 1004 contains fields representing locations, Location 1, Location 2, . . . , Location N. Each field of location attribute 1002 has a one-to-many relationship with corresponding beam direction lists 1006, 1008, 1010. As illustrated, Location 1 is associated with beam direction list 1006; Location 2 is associated with beam direction list 1008, and Location N is associated with beam direction list 1010. Each beam direction list 1006, 1008, 1010 may represent beam directions in order of prioritization.

In a related embodiment, data structure 1000 is arranged such that eNB attribute list 1002 has a many-to-one relationship to each field of location attribute 1004. Thus, a given location may be associated with multiple eNBs, and each of the associated eNBs may be associated with a beam direction list.

In a related embodiment, the devices associated with an eNB may share their respective beam-finding maps to disseminate mutually benefit from the collectively-gathered location-beam direction determinations. Sharing may be achieved using a centralized data store that integrates the beam-finding maps received from the various devices according to one approach. In another embodiment, UEs may utilize a distributed approach to sharing their beam-finding map data.

In the centralized approach, a central data store may be hosted on eNB 902, for example. In this approach, each UE 904, 906 may provide its respective locally-determined beam-finding map to eNB 902 using a feedback channel, control messages such as ACK/NAK messaging, or in regular uplink transmissions, as some examples. In turn, eNB 902 may distribute the integrated beam-finding map to UEs via one or more suitable communications channels (e.g., broadcast, unicast, a different radio-frequency band such as 2 GHz, 5 GHz, etc., or using another radio-access technology such as WLAN). The distributed beam-finding map includes location-beam direction information determined by eNB 902, and other UEs.

In the distributed approach, UEs 904, 906 may communicate with one another, or with other UEs that are associated with eNB 902, to share their respective beam-finding maps with one another. The UE-UE communications may be direct (e.g., peer-peer), or through an intermediary device, such as eNB 902, or another device. In one embodiment, the distributed approach differs from the centralized approach in that UEs operating according to the distributed approach may each receive multiple different beam-finding maps from the other UE devices and, for that matter, from eNB 902, and perform the integration of the information in those maps locally to produce their own beam-finding map based on their own beam-direction scanning, and on the results of scanning performed by other UE or eNB devices.

Figure 11:
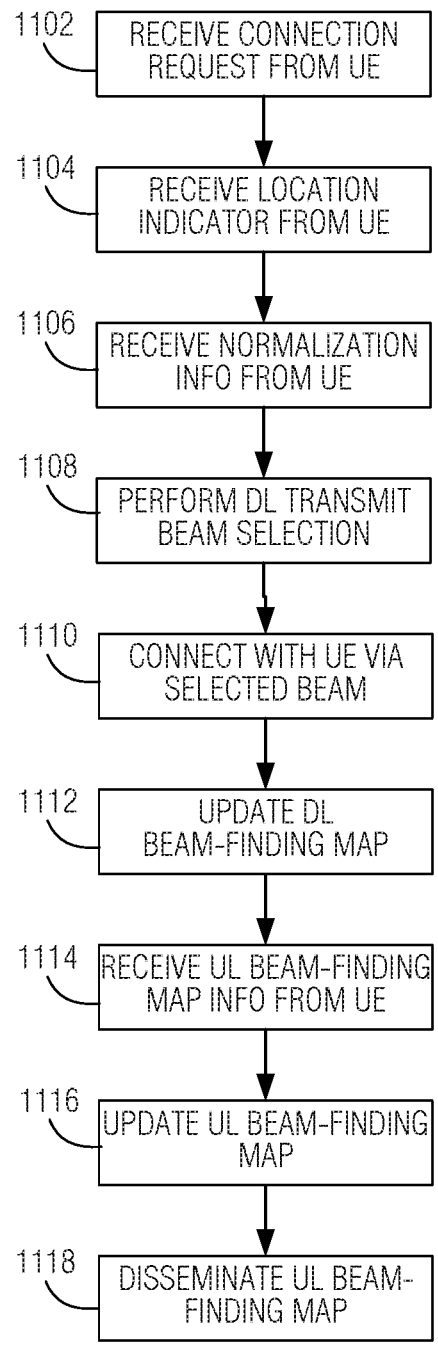
FIG. 11 is a process flow diagram illustrating operations performed by an eNB to support beam-finding for both, downlink (DL), and uplink (UL), transmissions according to some embodiments.
Figure 12:
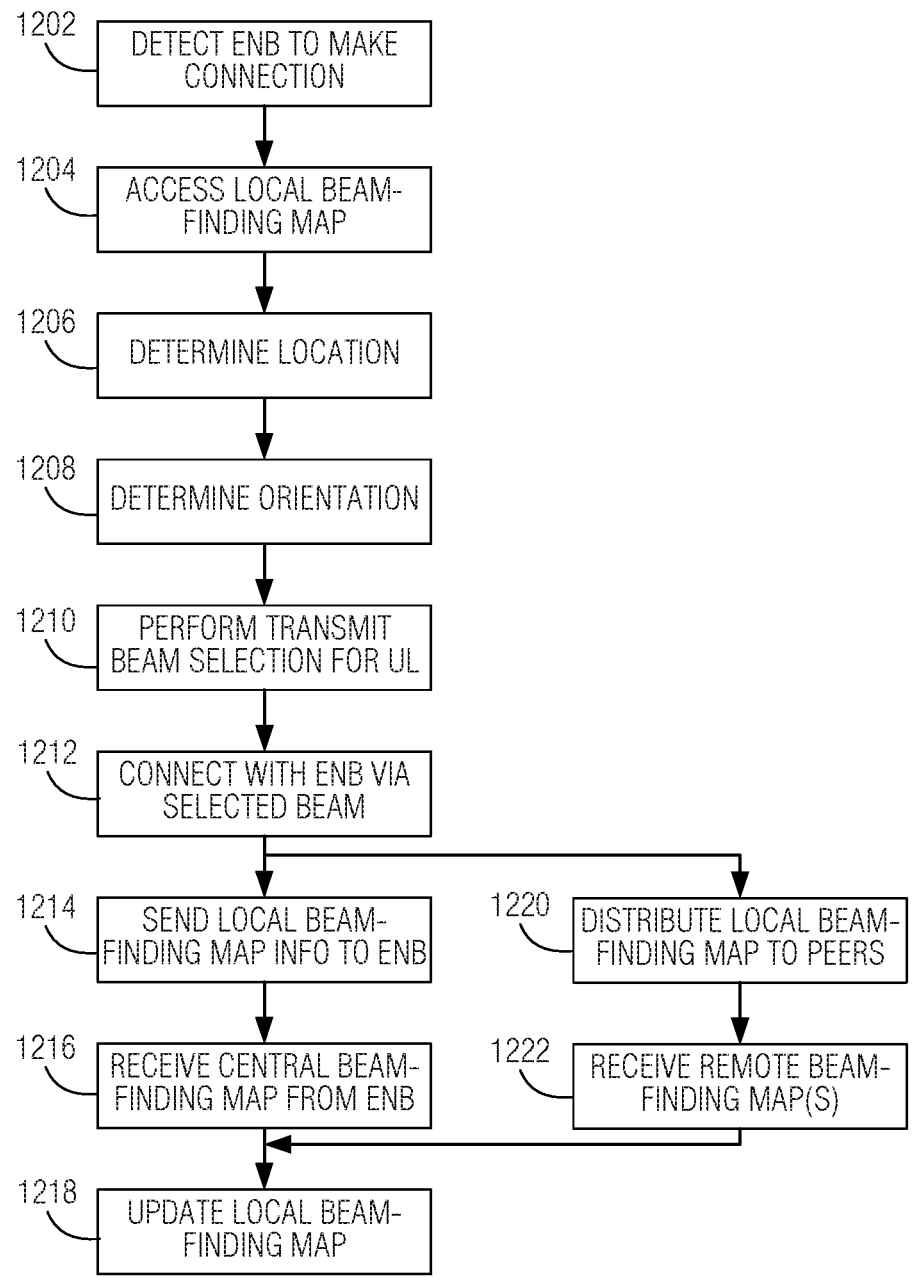
FIG. 12 is a flow diagram illustrating operations performed by a UE in connection with UL transmissions according to some embodiments.
Figure 13:
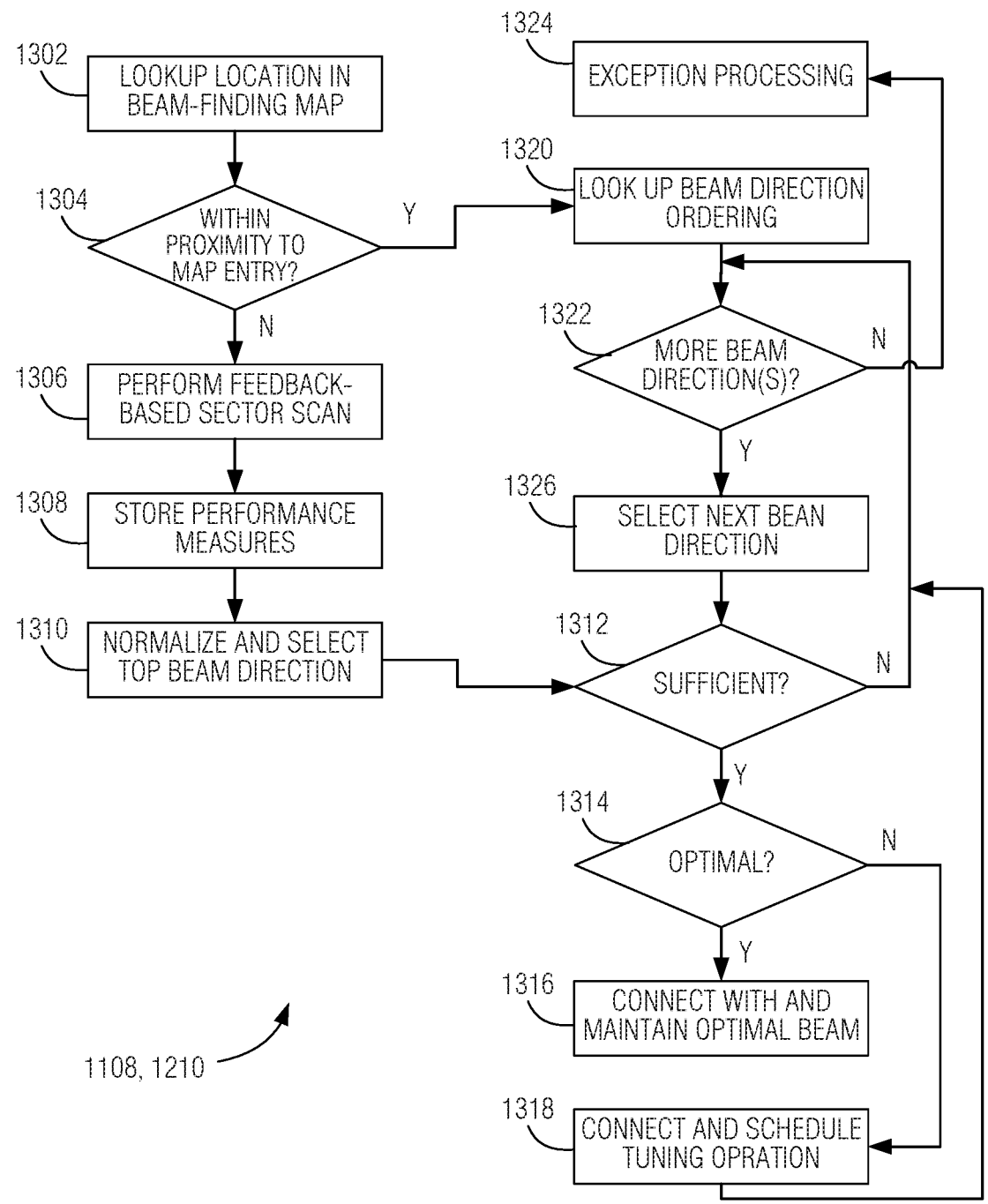
FIG. 13 is a flow diagram illustrating a process for performing beam selection according to some embodiments.

FIGS. 11-13 are flow diagrams illustrating various operations performed by eNB and UE devices according to various embodiments. It is important to note that the processes are richly-featured embodiments that may be realized as described; in addition, portions of the processes may be implemented while others are excluded in various embodiments. The following Additional Notes and Examples section details various combinations, without limitation, that are contemplated. It should also be noted that in various embodiments, certain process operations may be performed in a different ordering than depicted in FIGS. 11-13, provided that the logical flow and integrity of the process is not disrupted in substance.

FIG. 11 is a process flow diagram illustrating operations performed by an eNB to support beam-finding for both, downlink (DL), and uplink (UL), transmissions according to some embodiments. In this example, the eNB maintains a DL beam-finding map for use by the eNB to efficiently find a DL transmit beam direction, as well as a UL beam-finding map for use by UEs to efficiently find respective UL transmit beam directions.

At 1102, the eNB receives a connection request from a UE. The connection request may be communicated using an omnidirectional transmission, e.g., using the 2 GHz band. At 1104, the eNB receives a location indicator from the UE representing the location of the UE. The location indication may provide a two-dimensional location (e.g., latitude/longitude or some equivalent indicator such as a grid element index). At 1106, the eNB receives information from the UE relevant to normalization of the signal transmission performance measurement, such as, for instance, UE device type/form factor, context of use, device orientation, etc.

At 1108, the eNB performs a transmit beam selection process, such as the one described below with reference to FIG. 13, for example, applied to the downlink transmission. Operation 1108 is an interactive process between the eNB and UE that involves performance measure feedback to assess the effectiveness of the beam directions to be tested and selected. Operation 1108 produces either a selection of beam direction to utilize for DL transmission, or an exception condition in case a suitable beam direction cannot be found. The exception condition may result in the eNB selecting to use a more omnidirectional frequency band, for instance, or it may result in the eNB coordinating the use of a secondary cell to support the UE in its current location.

At 1110, the eNB establishes a connection with the UE using the selected beam direction. At 1112, the eNB updates its DL beam-finding map based on any changes called for as a result of the beam-selection process at 1108. Changes to the DL beam-finding map may be called for if a beam direction prioritization for a given location has been updated, for example.

At 1114, the eNB receives UL beam-finding map information from the UE. This information may include a copy of the UE's beam-finding map, or it may simply include some portion of the map such as the prioritized group of beam directions corresponding to the UE's present location, or the N most recent locations, where N is a defined value that may be UE-specific, cell-specific, eNB-specific, or a system-wide setting.

At 1116, the eNB incorporates the received UL beam-finding map information into an UL beam-finding map that it maintains as a centralized data store. At 118, the eNB disseminates the UL beam-finding map to one or more of the UEs that it serves. Various approaches are contemplated for disseminating the UL beam-finding map according to various embodiments. For instance, the UL beam-finding map may be sent via unicast transmissions to the one or more UEs; it may be broadcast using a broadcast channel (BCH); it may be sent via a system information broadcast, a system information block (SIB), or via radio resource channel (RRC) signaling; it may be sent via a different radio access technology (RAT) than the one to be used to make the eNB-UE connection (e.g., WiFi, LTE, etc.); it may be sent using a different frequency band that facilitates omnidirectional communications.

In a related embodiment, the eNB may use the UE location information obtained at 1104 to improve MU-MIMO scheduling. For instance, the eNB may reuse particular resource elements (REs) for UEs that are situated at highly-diverse (e.g., non-overlapping) beam directions, thereby reducing the risk of mutual interference in the downlink signaling for these UEs. In other words, in some embodiments, based on the indications of the current locations received by the eNB, the eNB may schedule MU-MIMO communications such that timeslot and channel re-use is more preferentially is applied to UE devices that have greater physical separation from one another than UE devices having less physical separation.

FIG. 12 is a flow diagram illustrating operations performed by a UE in connection with UL transmissions according to some embodiments. At 1202, the UE detects signaling from the eNB indicative of the UE's presence in the eNB's coverage area and the eNB's general availability for forming a connection with the UE. This signaling may be transmitted in an omnidirectional radiation pattern, or with a large beam width to facilitate discovery of connection availability. At 1204, the UE accesses its local beam-finding map and, at 1206, determines its current location. At 1208, the UE determines its orientation as well, allowing the UE to make use of the beam directions specified in the beam-finding map.

At 1210, the UE performs a transmit beam selection process such as the one described below with reference to FIG. 13, which produces a selection of a beam direction, an update of suitable beam directions, or an exception condition in response to a failure to find a sufficient beam direction. At 1212, the UE connects with the eNB using the selected beam, if an exception has not occurred.

At 1214, the UE shares its beam-finding map information to the eNB in embodiments where the eNB is used as a centralized data store of the beam-finding map for uplink transmissions. The UE's entire beam-finding map, or some portion thereof, may be sent in this operation. Portions may be the beam-finding map data pertaining to the UE's current location, or the N most recent locations, for example.

At 1216, the UE may receive the central beam-finding map for UL transmissions from the eNB. The central map may include beam directions for a plurality of locations served by the eNB, which may have been determined based on operations of the UE, or of other UEs served by the eNB. At 1218, the UE updates its own beam-finding map based on the received central map.

In an embodiment where a peer-distributed scheme is used among UEs to share beam-finding map information, at 1220, the UE distributes its locally-determined beam-finding map information to its peers. This distribution may be accomplished by peer-peer communications, or communications through the eNB or another base station or intermediary device. At 1222, the UE receives remote beam-finding map information from its peers via similar mechanisms of transfer. Notably operations 1220-1222 are not necessarily mutually-exclusive with operations 1214-1216, as illustrated.

FIG. 13 is a flow diagram illustrating a process for performing beam selection according to some embodiments. The process may be utilized in operations 1108 (FIG. 11) and 1210 (FIG. 12) for downlink, and uplink transmissions, respectively. At 1302, the transmitting device (which may be an eNB or UE) looks up the UE's determined location in the beam-finding map. At 1304, a decision is made as to whether the UE's location is associated with one or more beam directions according to the map or, if not specifically accounted for in the map, if the UE's present location is within some defined proximity to a mapped location having one or more beam directions associated with it.

In the negative case, i.e., where the, the map-assisted beam finding technique is unavailable, and the transmitting device performs feedback-based sector scanning at 1306. At 1308, performance measures for various beam directions, as determined during the sector scanning, are stored. At 1310, the performance measures are normalized based on the UE orientation, form factor, usage context, etc. The top normalized beam direction may be selected for possible use, and for possible inclusion in the beam-finding map.

The process advances to decisions 1312 and 1314 to determine whether any of the normalized performance measures are sufficient, and if so, whether they are also optimal. If a beam direction is associated with performance that is sufficient and optimal, the connection may be established immediately at 1316 with that beam direction, and maintained until a regularly-scheduled optimization cycle is called for. If one or more of the performance measures are sufficient, but none are optimal, at 1318 the connection is made the beam direction, and a tuning operation may be scheduled using other beam directions beginning at 1322.

If no further beam directions are available, the process branches to 1324 to perform exception processing. Various exception processing techniques are contemplated. For instance, in the case of a UE not finding a sufficient beam to use to connect to the eNB, the UE and eNB may instead connect to the eNB using a different frequency band. In a related embodiment, the UE may seek out a different eNB. In another related embodiment, the eNB may instruct the UE to preferentially connect to a secondary base station or using another radio access technology (RAT).

If, at decision 1322, there are additional beam directions to assess, the process advances to 1326 to select the next beam direction.

Referring back to decision 1304, if the UE's current location is associated with previously-selected beam directions, the process proceeds to 1320, where the priority ordering of the beam directions is looked up, and the beams are selected in order of priority for determining their suitability, as discussed above.

In a related embodiment, the eNB and UEs use the beam-finding map to select beam directions for receive beamforming. In an example, the same beam direction that is selected for transmit beamforming may be used for receive beamforming when communicating with the same device.

ADDITIONAL NOTES AND EXAMPLES

Example 1 is apparatus of user equipment (UE) configurable for millimeter-wave (mmW) uplink transmission beamforming, the apparatus comprising: memory; and processing circuitry to configure the UE to: determine a current location of the UE; read a beam-finding map that associates a plurality of locations with corresponding beam directions previously determined to be operative to direct an uplink transmission from those locations to a recipient device; in response to the beam-finding map having at least one beam direction operative from the current location to the recipient device, select a first beam direction from the beam-finding map based on the current location; and initiate the uplink transmission to be directed along the first beam direction to establish a connection with the recipient device.

In Example 2, the subject matter of Example 1 optionally includes wherein the processing circuitry is to further configure the UE to: select a receive beamforming direction based on the first beam direction.

In Example 3, the subject matter of any one or more of Examples 1-2 optionally include wherein the processing circuitry is to further configure the UE to: execute a sector-scan operation, in response to the beam-finding map lacking any beam directions operative from the current location, to discover any operative beam directions for directing uplink transmissions to the recipient device from the current location, the sector-scan operation including measurement of performance of transmissions along beam directions not previously determined to be operative.

In Example 4, the subject matter of Example 3 optionally includes wherein the processing circuitry is to further configure the UE to perform normalization of the measurement of the performance of the transmissions based on usage context of the UE.

In Example 5, the subject matter of any one or more of Examples 1-4 optionally include wherein the at least one beam direction operative from the current location includes at least one beam direction associated with the current location in the beam-finding map, and at least one beam direction associated with a location within a predefined proximity range of the current location.

In Example 6, the subject matter of any one or more of Examples 1-5 optionally include wherein the plurality of locations of the beam-finding map are represented as discrete elements of a grid, and wherein the current location is quantized to the elements of the grid.

In Example 7, the subject matter of any one or more of Examples 1-6 optionally include wherein the beam-finding map is stored in the UE.

In Example 8, the subject matter of any one or more of Examples 1-7 optionally include wherein the beam-finding map includes a plurality of beam directions previously assessed to be operative for effecting uplink transmission to the recipient device, the plurality of beam directions being associated with a first location.

In Example 9, the subject matter of Example 8 optionally includes wherein the plurality of beam directions includes an ordered group of beam directions being in order of selection priority.

In Example 10, the subject matter of any one or more of Examples 1-9 optionally include wherein the beam directions of the beam-finding map are determined by operation of a machine-learning process.

In Example 11, the subject matter of any one or more of Examples 1-10 optionally include wherein the beam directions of the beam-finding map include beam directions selected by at least one other UE, and disseminated to other devices by the at least one other UE.

In Example 12, the subject matter of any one or more of Examples 1-11 optionally include wherein the processing circuitry is to configure the UE to receive an update to the beam-finding map, the update containing locations and corresponding groups of beam directions.

In Example 13, the subject matter of any one or more of Examples 1-12 optionally include wherein the processing circuitry is to configure the UE to send at least a portion of the beam-finding map to another device.

In Example 14, the subject matter of Example 13 optionally includes wherein the other device is the recipient device.

In Example 15, the subject matter of any one or more of Examples 13-14 optionally include wherein the other device is another UE.

In Example 16, the subject matter of any one or more of Examples 1-15 optionally include wherein the recipient device is an evolved node-B (eNB) device of a long-term evolution (LTE) network.

In Example 17, the subject matter of any one or more of Examples 1-16 optionally include wherein the recipient device is an access point (AP) device of a wireless local area network (WLAN).

In Example 18, the subject matter of any one or more of Examples 1-17 optionally include transceiver circuitry operatively coupled to the processing circuitry.

In Example 19, the subject matter of any one or more of Examples 1-18 optionally include a plurality of antenna elements operatively coupled to the transceiver circuitry.

Example 20 is apparatus of radio access network (RAN) base station configurable for millimeter-wave (mmW) beam-formed radio communications with user equipment (UEs) within a service area, the apparatus comprising: memory; and processing circuitry to configure the base station to: maintain an uplink beam-finding map that associates a plurality of locations within the service area, with corresponding beam directions previously determined to be operative for UEs in those locations to direct uplink transmissions to the base station; and receive updates to the beam-finding map from the UEs in the service area, the updates including locations and corresponding beam directions selected by respective UE devices for uplink transmissions to the base station; incorporate the updates into the uplink beam-finding map; and disseminate the uplink beam-finding map to the UEs in the service area.

In Example 21, the subject matter of Example 20 optionally includes wherein the base station is an evolved node-B (eNB) device of a long-term evolution (LTE) network.

In Example 22, the subject matter of any one or more of Examples 20-21 optionally include wherein the base station is an access point (AP) device of a wireless local area network (WLAN).

In Example 23, the subject matter of any one or more of Examples 20-22 optionally include wherein the processing circuitry is to further configure the apparatus to: maintain a downlink beam-finding map that associates a plurality of locations within the service area, with corresponding downlink beam directions previously determined to be operative for the base station to direct downlink transmissions to the UEs at those locations; receive an indication of a current location of a first UE; in response to the downlink beam-finding map having at least one beam direction operative to the first UE, select a first beam direction from the downlink beam-finding map based on the current location of the first UE; and initiate a downlink transmission to be directed along the first beam direction to establish a connection with the first UE.

In Example 24, the subject matter of Example 23 optionally includes wherein the processing circuitry is to further configure the apparatus to: select a receive beamforming direction based on the first beam direction, the receive beamforming direction being associated with receiving uplink communications from the first UE.

In Example 25, the subject matter of any one or more of Examples 23-24 optionally include wherein the processing circuitry is to further configure the base station to: execute a sector-scan operation, in response to the downlink beam-finding map lacking any beam directions corresponding to the current location of the first UE, to discover any operative beam directions for directing downlink transmissions to the first UE, the sector-scan operation including measurement of performance of transmissions along beam directions not previously determined to be operative for achieving downlink communications to the current location.

In Example 26, the subject matter of any one or more of Examples 20-25 optionally include wherein the plurality of locations of the uplink beam-finding map are represented as discrete elements of a grid, and wherein the locations selected by respective UEs for uplink transmissions to the base station are quantized to the elements of the grid.

In Example 27, the subject matter of any one or more of Examples 20-26 optionally include wherein the uplink beam-finding map includes a plurality of beam directions previously assessed to be operative for effecting uplink transmission to the base station device, the plurality of beam directions being associated with a first location.

In Example 28, the subject matter of Example 27 optionally includes wherein the plurality of beam directions includes an ordered group of beam directions being in order of selection priority.

In Example 29, the subject matter of any one or more of Examples 20-28 optionally include wherein the beam directions of the uplink beam-finding map are determined by operation of a machine-learning process.

In Example 30, the subject matter of any one or more of Examples 20-29 optionally include wherein the processing circuitry is to further configure the apparatus to: receive indications of current locations of a plurality of UEs in the service area; and based on the indications of the current locations, schedule multi-user multiple input, multiple output (MU-MIMO) communications such that timeslot and channel re-use is preferentially applied to UEs that have greater physical separation from one another than UEs having less physical separation.

In Example 31, the subject matter of any one or more of Examples 20-30 optionally include transceiver circuitry operatively coupled to the processing circuitry.

In Example 32, the subject matter of any one or more of Examples 20-31 optionally include a plurality of antenna elements operatively coupled to the transceiver circuitry.

Example 33 is at least one machine-readable medium comprising instructions that, when executed on processing circuitry of an apparatus of user equipment (UE) configurable for millimeter-wave (mmW) uplink transmission beamforming, cause the apparatus to: determine a current location of the UE; read a beam-finding map that associates a plurality of locations with corresponding beam directions previously determined to be operative to direct uplink transmission from those locations to a recipient device; in response to the beam-finding map having at least one beam direction operative from the current location to the recipient device, select a first beam direction from the beam-finding map based on the current location; and initiate the uplink transmission to be directed along the first beam direction to establish a connection with the recipient device.

In Example 34, the subject matter of Example 33 optionally includes wherein the instructions are to configure the UE to: select a receive beamforming direction based on the first beam direction.

In Example 35, the subject matter of any one or more of Examples 33-34 optionally include wherein the instructions are to configure the UE to: execute a sector-scan operation, in response to the beam-finding map lacking any beam directions operative from the current location, to discover any operative beam directions for directing uplink transmissions to the recipient device from the current location, the sector-scan operation including measurement of performance of transmissions along beam directions not previously determined to be operative.

In Example 36, the subject matter of Example 35 optionally includes wherein the instructions are to further configure the UE to perform normalization of the measurement of the performance of the transmissions based on usage context of the UE.

In Example 37, the subject matter of any one or more of Examples 33-36 optionally include wherein the at least one beam direction operative from the current location includes at least one beam direction associated with the current location in the beam-finding map, and at least one beam direction associated with a location within a predefined proximity range of the current location.

In Example 38, the subject matter of any one or more of Examples 33-37 optionally include wherein the plurality of locations of the beam-finding map are represented as discrete elements of a grid, and wherein the current location is quantized to the elements of the grid.

In Example 39, the subject matter of any one or more of Examples 33-38 optionally include wherein the beam-finding map is stored in the UE.

In Example 40, the subject matter of any one or more of Examples 33-39 optionally include wherein the beam-finding map includes a plurality of beam directions previously assessed to be operative for effecting uplink transmission to the recipient device, the plurality of beam directions being associated with a first location.

In Example 41, the subject matter of Example 40 optionally includes wherein the plurality of beam directions includes an ordered group of beam directions being in order of selection priority.

In Example 42, the subject matter of any one or more of Examples 33-41 optionally include wherein the beam directions of the beam-finding map are determined by operation of a machine-learning process.

In Example 43, the subject matter of any one or more of Examples 33-42 optionally include wherein the beam directions of the beam-finding map include beam directions selected by at least one other UE, and disseminated to other devices by the at least one other UE.

In Example 44, the subject matter of any one or more of Examples 33-43 optionally include wherein the instructions are to configure the UE to receive an update to the beam-finding map, the update containing locations and corresponding groups of beam directions.

In Example 45, the subject matter of any one or more of Examples 33-44 optionally include wherein the instructions are to configure the UE to send at least a portion of the beam-finding map to another device.

In Example 46, the subject matter of Example 45 optionally includes wherein the other device is the recipient device.

In Example 47, the subject matter of any one or more of Examples 45-46 optionally include wherein the other device is another UE.

In Example 48, the subject matter of any one or more of Examples 33-47 optionally include wherein the recipient device is an evolved node-B (eNB) device of a long-term evolution (LTE) network.

In Example 49, the subject matter of any one or more of Examples 33-48 optionally include wherein the recipient device is an access point (AP) device of a wireless local area network (WLAN).

Example 50 is at least one machine-readable medium comprising instructions that, when executed on processing circuitry of an apparatus of a radio access network (RAN) base station configurable for millimeter-wave (mmW) beam-formed radio communications with user equipment (UE) devices within a service area, cause the apparatus to: maintain an uplink beam-finding map that associates a plurality of locations within the service area, with corresponding beam directions previously determined to be operative for UEs in those locations to direct uplink transmissions to the base station; and receive updates to the beam-finding map from the UEs in the service area, the updates including locations and corresponding beam directions selected by respective UE devices for uplink transmissions to the base station; incorporate the updates into the uplink beam-finding map; and disseminate the uplink beam-finding map to the UEs in the service area.

In Example 51, the subject matter of Example 50 optionally includes wherein the base station is an evolved node-B (eNB) device of a long-term evolution (LTE) network.

In Example 52, the subject matter of any one or more of Examples 50-51 optionally include wherein the base station is an access point (AP) device of a wireless local area network (WLAN).

In Example 53, the subject matter of any one or more of Examples 50-52 optionally include wherein the instructions are to further configure the apparatus to: maintain a downlink beam-finding map that associates a plurality of locations within the service area, with corresponding downlink beam directions previously determined to be operative for the base station to direct downlink transmissions to the UEs at those locations; receive an indication of a current location of a first UE; in response to the downlink beam-finding map having at least one beam direction operative to the first UE, select a first beam direction from the downlink beam-finding map based on the current location of the first UE; and initiate a downlink transmission to be directed along the first beam direction to establish a connection with the first UE.

In Example 54, the subject matter of Example 53 optionally includes wherein the instructions are to further configure the apparatus to: select a receive beamforming direction based on the first beam direction, the receive beamforming direction being associated with receiving uplink communications from the first UE.

In Example 55, the subject matter of any one or more of Examples 53-54 optionally include wherein the instructions are to further configure the apparatus to: execute a sector-scan operation, in response to the downlink beam-finding map lacking any beam directions corresponding to the current location of the first UE, to discover any operative beam directions for directing downlink transmissions to the first UE, the sector-scan operation including measurement of performance of transmissions along beam directions not previously determined to be operative for achieving downlink communications to the current location.

In Example 56, the subject matter of any one or more of Examples 50-55 optionally include wherein the plurality of locations of the uplink beam-finding map are represented as discrete elements of a grid, and wherein the locations selected by respective UEs for uplink transmissions to the base station are quantized to the elements of the grid.

In Example 57, the subject matter of any one or more of Examples 50-56 optionally include wherein the uplink beam-finding map includes a plurality of beam directions previously assessed to be operative for effecting uplink transmission to the base station device, the plurality of beam directions being associated with a first location.

In Example 58, the subject matter of Example 57 optionally includes wherein the plurality of beam directions includes an ordered group of beam directions being in order of selection priority.

In Example 59, the subject matter of any one or more of Examples 50-58 optionally include wherein the beam directions of the uplink beam-finding map are determined by operation of a machine-learning process.

In Example 60, the subject matter of any one or more of Examples 50-59 optionally include wherein the instructions are to further configure the apparatus to: receive indications of current locations of a plurality of UEs in the service area; and based on the indications of the current locations, schedule multi-user multiple input, multiple output (MU-MIMO) communications such that timeslot and channel re-use is preferentially applied to UEs that have greater physical separation from one another than UEs having less physical separation.

Example 61 is a system for configuring user equipment (UE) for uplink transmission beamforming, the system comprising: means for determining a current location of the UE; means for reading a beam-finding map that associates a plurality of locations with corresponding beam directions previously determined to be operative to direct uplink transmission from those locations to a recipient device; means for selecting a first beam direction from the beam-finding map based on the current location in response to the beam-finding map having at least one beam direction operative from the current location to the recipient device; and means for initiating the uplink transmission to be directed along the first beam direction to establish a connection with the recipient device.

In Example 62, the subject matter of Example 61 optionally includes means for selecting a receive beamforming direction based on the first beam direction.

In Example 63, the subject matter of any one or more of Examples 61-62 optionally include means for executing a sector-scan operation, in response to the beam-finding map lacking any beam directions operative from the current location, to discover any operative beam directions for directing uplink transmissions to the recipient device from the current location, the sector-scan operation including measurement of performance of transmissions along beam directions not previously determined to be operative.

In Example 64, the subject matter of Example 63 optionally includes means for normalizing the measurement of the performance of the transmissions based on usage context of the UE.

In Example 65, the subject matter of any one or more of Examples 61-64 optionally include wherein the at least one beam direction operative from the current location includes at least one beam direction associated with the current location in the beam-finding map, and at least one beam direction associated with a location within a predefined proximity range of the current location.

In Example 66, the subject matter of any one or more of Examples 61-65 optionally include wherein the plurality of locations of the beam-finding map are represented as discrete elements of a grid, and wherein the current location is quantized to the elements of the grid.

In Example 67, the subject matter of any one or more of Examples 61-66 optionally include wherein the beam-finding map is stored in the UE.

In Example 68, the subject matter of any one or more of Examples 61-67 optionally include wherein the beam-finding map includes a plurality of beam directions previously assessed to be operative for effecting uplink transmission to the recipient device, the plurality of beam directions being associated with a first location.

In Example 69, the subject matter of Example 68 optionally includes wherein the plurality of beam directions includes an ordered group of beam directions being in order of selection priority.

In Example 70, the subject matter of any one or more of Examples 61-69 optionally include wherein the beam directions of the beam-finding map are determined by operation of means for machine learning.

In Example 71, the subject matter of any one or more of Examples 61-70 optionally include wherein the beam directions of the beam-finding map include beam directions selected by at least one other UE, and disseminated to other devices by the at least one other UE.

In Example 72, the subject matter of any one or more of Examples 61-71 optionally include wherein the processing circuitry is to configure the UE to receive an update to the beam-finding map, the update containing locations and corresponding groups of beam directions.

In Example 73, the subject matter of any one or more of Examples 61-72 optionally include means for sending at least a portion of the beam-finding map to another device.

In Example 74, the subject matter of Example 73 optionally includes wherein the other device is the recipient device.

In Example 75, the subject matter of any one or more of Examples 73-74 optionally include wherein the other device is another UE.

In Example 76, the subject matter of any one or more of Examples 61-75 optionally include wherein the recipient device is an evolved node-B (eNB) device of a long-term evolution (LTE) network.

In Example 77, the subject matter of any one or more of Examples 61-76 optionally include wherein the recipient device is an access point (AP) device of a wireless local area network (WLAN).

In Example 78, the subject matter of any one or more of Examples 61-77 optionally include transceiver circuitry operatively coupled to the processing circuitry.

In Example 79, the subject matter of any one or more of Examples 61-78 optionally include a plurality of antenna elements operatively coupled to the transceiver circuitry.

Example 80 is a system for a radio access network (RAN) base station configurable for millimeter-wave (mmW) beam-formed radio communications with user equipment (UEs) within a service area, the system comprising: means for maintaining an uplink beam-finding map that associates a plurality of locations within the service area, with corresponding beam directions previously determined to be operative for UEs in those locations to direct uplink transmissions to the base station; and means for receiving updates to the beam-finding map from the UEs in the service area, the updates including locations and corresponding beam directions selected by respective UE devices for uplink transmissions to the base station; means for incorporating the updates into the uplink beam-finding map; and means for disseminating the uplink beam-finding map to the UEs in the service area.

In Example 81, the subject matter of Example 80 optionally includes wherein the base station is an evolved node-B (eNB) device of a long-term evolution (LTE) network.

In Example 82, the subject matter of any one or more of Examples 80-81 optionally include wherein the base station is an access point (AP) device of a wireless local area network (WLAN).

In Example 83, the subject matter of any one or more of Examples 80-82 optionally include means for maintaining a downlink beam-finding map that associates a plurality of locations within the service area, with corresponding downlink beam directions previously determined to be operative for the base station to direct downlink transmissions to the UEs at those locations; means for receiving an indication of a current location of a first UE; means for selecting a first beam direction from the downlink beam-finding map based on the current location of the first UE in response to the downlink beam-finding map having at least one beam direction operative to the first UE; and means for initiating a downlink transmission to be directed along the first beam direction to establish a connection with the first UE.

In Example 84, the subject matter of Example 83 optionally includes means for selecting a receive beamforming direction based on the first beam direction, the receive beamforming direction being associated with receiving uplink communications from the first UE.

In Example 85, the subject matter of any one or more of Examples 83-84 optionally include means for executing a sector-scan operation, in response to the downlink beam-finding map lacking any beam directions corresponding to the current location of the first UE, to discover any operative beam directions for directing downlink transmissions to the first UE, the sector-scan operation including measurement of performance of transmissions along beam directions not previously determined to be operative for achieving downlink communications to the current location.

In Example 86, the subject matter of any one or more of Examples 80-85 optionally include wherein the plurality of locations of the uplink beam-finding map are represented as discrete elements of a grid, and wherein the locations selected by respective UEs for uplink transmissions to the base station are quantized to the elements of the grid.

In Example 87, the subject matter of any one or more of Examples 80-86 optionally include wherein the uplink beam-finding map includes a plurality of beam directions previously assessed to be operative for effecting uplink transmission to the base station device, the plurality of beam directions being associated with a first location.

In Example 88, the subject matter of Example 87 optionally includes wherein the plurality of beam directions includes an ordered group of beam directions being in order of selection priority.

In Example 89, the subject matter of any one or more of Examples 80-88 optionally include wherein the beam directions of the uplink beam-finding map are determined by operation of a machine-learning process.

In Example 90, the subject matter of any one or more of Examples 80-89 optionally include means for receiving indications of current locations of a plurality of UEs in the service area; and means for scheduling multi-user multiple input, multiple output (MU-MIMO) communications based on the indications of the current locations, such that timeslot and channel re-use is preferentially applied to UEs that have greater physical separation from one another than UEs having less physical separation.

In Example 91, the subject matter of any one or more of Examples 80-90 optionally include transceiver circuitry operatively coupled to the processing circuitry.

In Example 92, the subject matter of any one or more of Examples 80-91 optionally include a plurality of antenna elements operatively coupled to the transceiver circuitry.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. Apparatus of user equipment (UE) configurable for millimeter-wave (mmW) uplink transmission beamforming, the apparatus comprising:
   memory; and
   processing circuitry to configure the UE to:
   determine a current location of the UE;
   read a beam-finding map that associates each of plurality of locations with an ordered list of sectors corresponding to beam directions previously determined to be operative to direct an uplink transmission from those locations to one or more of a plurality of Node Bs device, wherein sectors higher in order on the ordered list are associated with a higher performance measurement for communicating with one of the Node Bs;
   determine from the map, based on the current location of the UE, an order of sectors for performing a sector scan;

initiate the sector scan with a first sector on the ordered list based on the order of the sectors for the current location of the UE;
terminate the sector scan when a sector is identified that meets a predetermined performance measurement;
initiate the uplink transmission to be directed along a beam direction corresponding to the identified sector to establish a connection with the Node B associated with the identified sector,
wherein the beam-finding map is stored in the memory of the UE.

2. The apparatus of claim 1, wherein the plurality of locations of the beam-finding map are represented as discrete elements of a grid, and wherein the current location is quantized to the elements of the grid.

3. The apparatus of claim 1, wherein the beam-finding map includes a plurality of beam directions previously assessed to be operative for effecting uplink transmission to the recipient device, the plurality of beam directions being associated with a first location.

4. The apparatus of claim 1, wherein the beam directions of the beam-finding map are determined by operation of a machine-learning process performed by the processing circuitry of the UE.

5. The apparatus of claim 1, wherein the beam directions of the beam-finding map include beam directions selected by at least one other UE, and disseminated to other devices by the at least one other UE.

6. The apparatus of claim 1, wherein the processing circuitry is to configure the UE to receive an update to the beam-finding map, the update containing locations and corresponding groups of beam directions.

7. The apparatus of claim 1, wherein the processing circuitry is to configure the UE to send at least a portion of the beam-finding map to another device.

8. The apparatus of claim 1, further comprising:
transceiver circuitry operatively coupled to the processing circuitry.

9. The apparatus of claim 1, further comprising:
a plurality of antenna elements operatively coupled to the transceiver circuitry.

10. Apparatus of radio access network (RAN) base station configurable for millimeter-wave (mmW) beam-formed radio communications with user equipment (UEs) within a service area, the apparatus comprising:
memory; and
processing circuitry to configure the base station to:
maintain an uplink beam-finding map that associates a plurality of locations within the service area, with corresponding beam directions previously determined to be operative for UEs in those locations to direct uplink transmissions to the base station; and
receive updates to the beam-finding map from the UEs in the service area, the updates including locations and corresponding beam directions selected by respective UE devices for uplink transmissions to the base station;
incorporate the updates into the uplink beam-finding map; and
disseminate the uplink beam-finding map to the UEs in the service area,
wherein the processing circuitry is to further configure the apparatus to:
receive indications of current locations of a plurality of UEs in the service area; and
based on the indications of the current locations, schedule multi-user multiple input, multiple output (MU-MIMO) communications such that timeslot and channel re-use is preferentially applied to UEs that have greater physical separation from one another than UEs having less physical separation.

11. The apparatus of claim 10, further comprising:
transceiver circuitry operatively coupled to the processing circuitry.

12. At least one non-transitory machine-readable medium comprising instructions that, when executed on processing circuitry of an apparatus of user equipment (UE) configurable for millimeter-wave (mmW) uplink transmission beamforming, cause the apparatus to:
determine a current location of the UE;
read a beam-finding map that associates each of plurality of locations with an ordered list of sectors corresponding to beam directions previously determined to be operative to direct an uplink transmission from those locations to one or more of a plurality of Node Bs device, wherein sectors higher in order on the ordered list are associated with a higher performance measurement for communicating with one of the Node Bs;
determine from the map, based on the current location of the UE, an order of sectors for performing a sector scan;
initiate the sector scan with a first sector on the ordered list based on the order of the sectors for the current location of the UE;
terminate the sector scan when a sector is identified that meets a predetermined performance measurement;
initiate the uplink transmission to be directed along the first beam direction corresponding to the identified sector to establish a connection with the Node B associated with the identified sector,
wherein the beam-finding map is stored in a memory of the UE.

13. The at least one machine-readable medium of claim 12, wherein the instructions are to configure the UE to:
select a receive beamforming direction based on the identified sector.

14. The at least one machine-readable medium of claim 12, wherein the beam directions of the beam-finding map are determined by operation of a machine-learning process performed by the processing circuitry of the UE.

15. The at least one machine-readable medium of claim 12, wherein the instructions are to configure the UE to receive an update to the beam-finding map, the update containing locations and corresponding groups of beam directions.

16. The at least one machine-readable medium of claim 12, wherein the instructions are to configure the UE to send at least a portion of the beam-finding map to another device.

17. At least one no machine-readable medium comprising instructions that, when executed on processing circuitry of an apparatus of a radio access network (RAN) base station configurable for millimeter-wave (mmW) beam-formed radio communications with user equipment (UE) devices within a service area, cause the apparatus to:
maintain an uplink beam-finding map that associates a plurality of locations within the service area, with corresponding beam directions previously determined to be operative for UEs in those locations to direct uplink transmissions to the base station; and
receive updates to the beam-finding map from the UEs in the service area, the updates including locations and corresponding beam directions selected by respective UE devices for uplink transmissions to the base station;
incorporate the updates into the uplink beam-finding map; and disseminate the uplink beam-finding map to the UEs in the service area, receive indications of current locations of a plurality of UEs in the service area; and based on the indications of the current locations, schedule multi-user multiple input, multiple output (MU-MIMO) communications such that timeslot and channel re-use is preferentially applied to UEs that have greater physical separation from one another than UEs having less physical separation.

* * * * *

UNITED STATES PATENT AND TRADEMARK OFFICE
CERTIFICATE OF CORRECTION

PATENT NO. : 10,700,757 B2  
APPLICATION NO. : 16/082752  
DATED : June 30, 2020  
INVENTOR(S) : Singh et al.

Page 1 of 1

It is certified that error appears in the above-identified patent and that said Letters Patent is hereby corrected as shown below:

In the Claims

In Column 36, Line 35, in Claim 13, after "one", insert --non-transitory--

In Column 36, Line 39, in Claim 14, after "one", insert --non-transitory--

In Column 36, Line 43, in Claim 15, after "one", insert --non-transitory--

In Column 36, Line 48, in Claim 16, after "one", insert --non-transitory--

In Column 36, Line 51, in Claim 17, delete "no" and insert --non-transitory-- therefor Signed and Sealed this  
Fourteenth Day of December, 2021

Drew Hirshfeld  
*Performing the Functions and Duties of the  
Under Secretary of Commerce for Intellectual Property and  
Director of the United States Patent and Trademark Office*